United States Patent
Grip et al.

(10) Patent No.: US 11,939,150 B2
(45) Date of Patent: Mar. 26, 2024

(54) TRANSFORMABLE REFRIGERATED CARGO CONTAINERS

(71) Applicant: The Boeing Company, Chicago, IL (US)

(72) Inventors: Robert E. Grip, Rancho Palos Verdes, CA (US); Jared Backues, Chicago, IL (US); Ted K. Rothaupt, Chicago, IL (US)

(73) Assignee: The Boeing Company, Arlington, VA (US)

( * ) Notice: Subject to any disclaimer, the term of this patent is extended or adjusted under 35 U.S.C. 154(b) by 64 days.

(21) Appl. No.: 17/580,072

(22) Filed: Jan. 20, 2022

(65) Prior Publication Data

US 2023/0227250 A1    Jul. 20, 2023

(51) Int. Cl.
   *B65D 88/74*    (2006.01)
   *F25D 3/12*    (2006.01)
   *F25D 11/00*    (2006.01)
   *F25D 29/00*    (2006.01)

(52) U.S. Cl.
   CPC ............ *B65D 88/74* (2013.01); *F25D 3/125* (2013.01); *F25D 11/003* (2013.01); *F25D 29/003* (2013.01); *F25B 2400/01* (2013.01); *F25B 2400/06* (2013.01); *F25D 2400/02* (2013.01)

(58) Field of Classification Search
   CPC ....... B65D 88/74; F25D 3/125; F25D 11/003; F25D 29/003; F25D 2400/02; F25B 2400/01; F25B 2400/06
   See application file for complete search history.

(56) References Cited

U.S. PATENT DOCUMENTS

| 5,125,237 A | * | 6/1992 | Saia et al. ............ | F25D 29/001 |
| | | | | 62/239 |
| 2004/0035139 A1 | * | 2/2004 | Lindsey et al. ....... | F25D 11/003 |
| | | | | 62/371 |
| 2007/0289976 A1 | * | 8/2007 | Meyer et al. ......... | F25D 11/003 |
| | | | | 220/592.09 |

(Continued)

FOREIGN PATENT DOCUMENTS

| WO | 2007/130770 A2 | 11/2007 | |
| WO | WO 2007130770 A2 * | 11/2007 | ............. B65D 88/14 |

*Primary Examiner* — Elizabeth J Martin
*Assistant Examiner* — Dario Antonio Deleon
(74) *Attorney, Agent, or Firm* — McDonnell Boehnen Hulbert & Berghoff LLP

(57) ABSTRACT

A transformable cargo container for use with ground and air transportation vehicles is disclosed. The cargo container includes a main container body defining a storage chamber therein and including at least one inlet. The cargo container also includes a transformable assembly coupled to the main container body and positioned at an exterior of the main container body. The transformable assembly includes one or more supplemental containers and one or more supply ducts, at least one of the supplemental container(s) being configured to house refrigeration equipment. The transformable assembly is moveable between an aircraft configuration and a ground configuration. Based on the transformable assembly being in either the aircraft configuration or the ground configuration, the refrigeration equipment is configured to supply coolant into the main container body via the supply duct(s) and the inlet(s).

21 Claims, 19 Drawing Sheets

(56) References Cited

U.S. PATENT DOCUMENTS

2009/0184126 A1* 7/2009 Glaser et al. .......... B65D 88/14
  220/562
2019/0195547 A1* 6/2019 Moon et al. ............ F25D 3/105
2021/0094772 A1* 4/2021 Zhao et al. .......... B65D 88/745

* cited by examiner

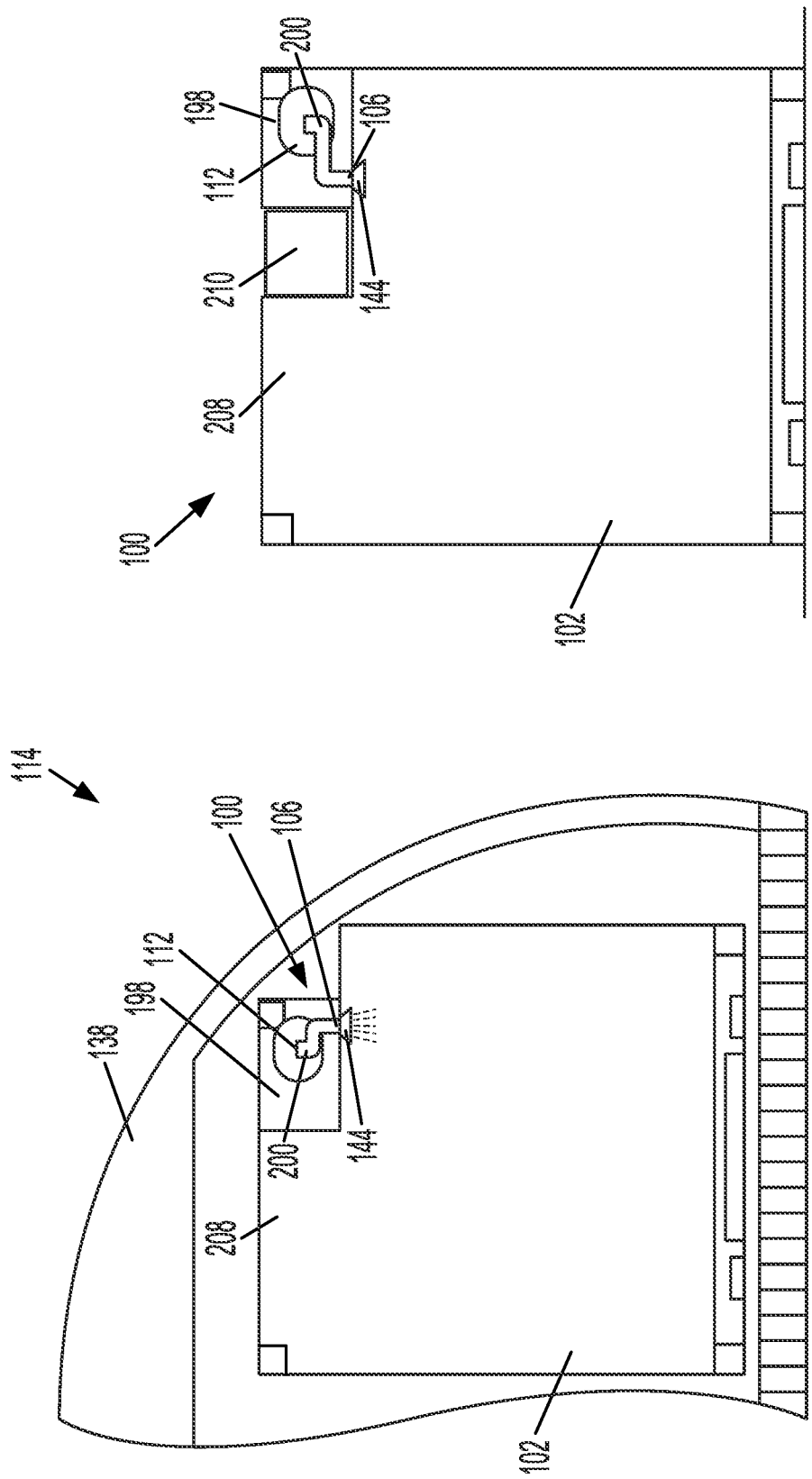

TRANSFORMABLE REFRIGERATED CARGO CONTAINERS

FIELD

The present disclosure relates generally to cargo containers, and more particularly, to transformable cargo containers for use with both ground/water transportation vehicles and air transportation vehicles.

BACKGROUND

Cargo containers used for intermodal transportation are often used to transport temperature-sensitive products. And for certain temperature-sensitive products, such as pharmaceutical products or perishable products, it is typically desired or required for the temperature to be tightly controlled within such cargo containers during transportation. That is, even if the temperature falls outside a desired temperature range for even a very short time (e.g. a few minutes), such a product can be ruined or can have its value greatly reduced.

Existing refrigerated cargo containers used for ground or water transportation are typically able to maintain adequate temperature control for temperature-sensitive products. However, when such products are moved between ground/water transportation vehicles and air transportation vehicles, there is typically a short period of time in which the desired temperature for those products is not maintained. This can be referred to as a break in the cold chain.

By way of example, in order to move such products from existing refrigerated cargo containers for ground/water transportation into existing refrigerated cargo containers for air transportation, the products are typically unloaded from the ground/water transportation cargo containers and then loaded into the air transportation cargo containers. Likewise, in order to move such products from the air transportation cargo containers into the ground/water transportation containers, the products are typically unloaded from the air transportation cargo containers and then loaded into the ground/water transportation cargo containers. In each of these situations, there is a break in the cold chain during the loading and unloading of the products.

Furthermore, the shape and/or size of existing refrigerated or non-refrigerated air transportation cargo containers, while selected to better utilize available space in aircrafts, are often incompatible with the sizes and shapes that are desired for storage on ground/water transportation vehicles, due to the differences between partially-circular cross-sectional storage areas of aircrafts and rectangular cross-sectional storage areas of trucks, train cars, etc. For instance, some existing air transportation cargo containers can have chamfered corners, which makes it easier to transport such containers in an aircraft, but makes it more difficult to stack such containers on each other when transported on a ground/water transportation vehicle. In addition, the volumetric efficiency of existing air transportation cargo containers when transported on a ground/water transportation vehicle can be low.

For at least these reasons, what is needed is a cargo container that is more efficient for use with intermodal travel involving an aircraft and that can help reduce or prevent breaks in the cold chain when transporting temperature-sensitive products.

SUMMARY

In an example, a transformable cargo container for use with ground and air transportation vehicles is disclosed. The transformable cargo container includes a main container body defining a storage chamber therein and including at least one inlet. The transformable cargo container also includes a transformable assembly coupled to the main container body and positioned at an exterior of the main container body. The transformable assembly includes one or more supplemental containers and one or more supply ducts, at least one of the one or more supplemental containers being configured to house refrigeration equipment. The refrigeration equipment is configured to control a temperature inside the main container body. The transformable assembly is movable between an aircraft configuration and a ground configuration. Based on the transformable assembly being in the aircraft configuration, the refrigeration equipment is configured to supply coolant into the main container body via the one or more supply ducts and the at least one inlet. And based on the transformable assembly being in the ground configuration, the refrigeration equipment is configured to supply coolant into the main container body via the one or more supply ducts and the at least one inlet.

In another example, a method is disclosed. The method includes moving a transformable assembly of a transformable cargo container from a ground configuration to an aircraft configuration, where the transformable assembly is coupled to a main container body of the transformable cargo container and comprises one or more supplemental containers, at least one of the one or more supplemental containers being configured to house refrigeration equipment, where the refrigeration equipment is configured to control a temperature inside the main container body, and where based on the transformable assembly being in the aircraft configuration, the refrigeration equipment is configured to supply coolant into the main container body. The method also includes loading the transformable cargo container into a fuselage of an aircraft based on the transformable assembly being in the aircraft configuration.

In another example, a transformable cargo container for use with ground and air transportation vehicles is disclosed. The transformable cargo container includes a main container body defining a storage chamber therein and including at least one inlet. The transformable cargo container also includes a transformable assembly coupled to the main container body and positioned at an exterior of the main container body. The transformable assembly includes one or more supplemental containers and one or more supply ducts, at least one of the one or more supplemental containers being configured to house refrigeration equipment. The refrigeration equipment is configured to control a temperature inside the main container body. The transformable assembly is movable between an aircraft configuration and a ground configuration. Based on the transformable assembly being in the aircraft configuration, (i) the one or more supplemental containers are positioned on top of the main container body in a first position and (ii) the refrigeration equipment is configured to supply coolant into the main container body via the one or more supply ducts and the at least one inlet. And based on the transformable assembly being in the ground configuration, (i) the one or more supplemental containers are positioned on top of the main container body in a second position on top of the main container body, different from the first position, and (ii) the refrigeration equipment is configured to supply coolant into the main container body via the one or more supply ducts and the at least one inlet.

In another example, a transformable cargo container for use with ground and air transportation vehicles is disclosed.

The transformable cargo container includes a main container body defining a storage chamber therein. The transformable cargo container also includes a transformable assembly coupled to the main container body and positioned at an exterior of the main container body. The transformable assembly includes one or more supplemental containers and is movable between an aircraft configuration and a ground configuration. Based on the transformable assembly being in the aircraft configuration, the transformable cargo container has a non-rectangular cross-sectional area and is configured to occupy a partially-circular cross-sectional storage area of a fuselage of an aircraft. And based on the transformable assembly being in the ground configuration, the transformable cargo container is configured to occupy a rectangular cross-sectional storage area on a ground transportation vehicle.

In another example, a method is disclosed. The method includes moving a transformable assembly of a transformable cargo container from a ground configuration to an aircraft configuration, the transformable cargo container comprising a main container body defining a storage chamber therein, where the transformable assembly is coupled to the main container body and positioned at an exterior of the main container body, where the transformable assembly comprises one or more supplemental containers, and where based on the transformable assembly being in the aircraft configuration, the transformable cargo container has a non-rectangular cross-sectional area. The method also includes loading the transformable cargo container into a partially-circular cross-sectional storage area of a fuselage of an aircraft based on the transformable assembly being in the aircraft configuration.

In another example, a transformable cargo container for use with ground and air transportation vehicles is disclosed. The transformable cargo container includes a main container body defining a storage chamber therein. The transformable cargo container also includes a transformable assembly coupled to the main container body and positioned at an exterior of the main container body. The transformable assembly includes one or more supplemental containers and is movable between an aircraft configuration and a ground configuration. Based on the transformable assembly being in the aircraft configuration, (i) the transformable cargo container is configured to occupy a partially-circular cross-sectional storage area of a fuselage of an aircraft and (ii) the one or more supplemental containers are positioned on top of the main container body in a first position. And based on the transformable assembly being in the ground configuration, (i) the transformable cargo container is configured to occupy a rectangular cross-sectional storage area on a ground transportation vehicle and (ii) the one or more supplemental containers are positioned on top of the main container body in a second position on top of the main container body, different from the first position.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 26 depicts a transformable cargo container in an aircraft configuration and stored in a fuselage of an aircraft, according to an example implementation.

FIG. 27 depicts a perspective view of a transformable cargo container in a ground configuration, with another container stacked thereon, according to an example implementation.

DETAILED DESCRIPTION

Figure 1:
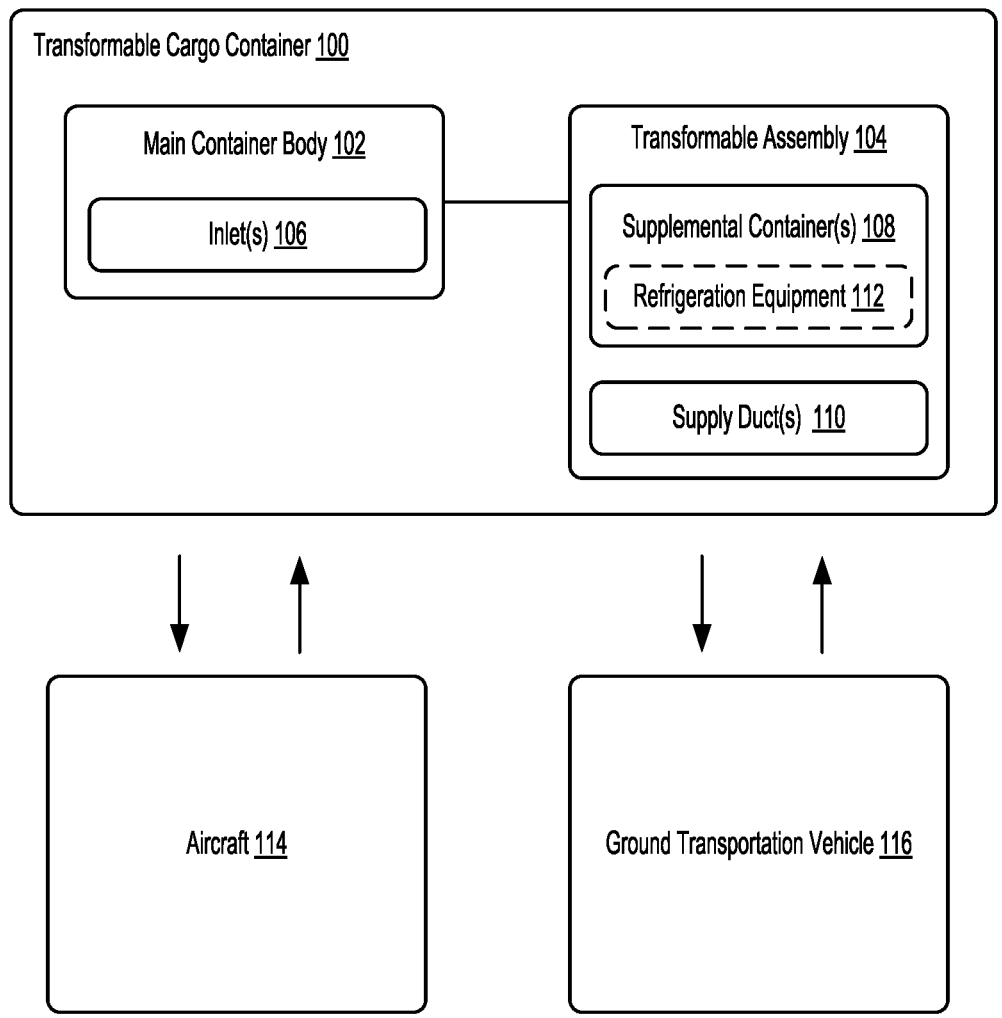
FIG. 1 depicts a transformable cargo container, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Unless otherwise specifically noted, elements depicted in the drawings are not necessarily drawn to scale.

Within examples, described herein are transformable cargo containers and a corresponding method for use with ground transportation vehicles and air transportation vehicles. The term "ground," as used herein, refers to transportation by road, rail, water, or other means of transportation other than air transportation. Thus, a ground transportation vehicle can take the form of a truck, train, cargo ship, or other vehicle configured to travel by ground or water, and a ground configuration of the disclosed transformable cargo container can be a configuration of the transformable cargo container that is suitable for storage of the transformable cargo container on such a ground transportation vehicle.

Furthermore, the disclosed transformable cargo containers can take the form of refrigerated cargo containers or non-refrigerated cargo containers. That is, the embodiments disclosed herein, while primarily described and illustrated in the context of refrigerated cargo containers and maintaining refrigeration during intermodal transportation, can also be implemented in non-refrigeration scenarios. As described in more detail below, both the disclosed refrigerated cargo containers and disclosed non-refrigerated cargo containers (also referred to herein collectively as "transformable cargo containers") can have the same advantage of efficient transfer between ground and air transportation without having to unload stored goods from one cargo container and load those goods into a different cargo container. In addition, although temperature-related embodiments are primarily described herein as refrigerated embodiments, it should be understood that heating equipment could be used additionally or alternatively to refrigeration equipment, such as in situations where the stored cargo needs to be kept warm or hot during transportation.

The disclosed transformable cargo container includes a main container body defining a storage chamber therein and including at least one inlet. The disclosed transformable cargo container also includes a transformable assembly coupled to the main container body and positioned at an exterior of the main container body. The transformable assembly is movable between an aircraft configuration and a ground configuration, and includes one or more supplemental containers and one or more supply ducts. At least one of the one or more supplemental containers is configured to house refrigeration equipment that is used to control the temperature inside the main container body.

Based on the transformable assembly being in the aircraft configuration, the refrigeration equipment is configured to supply coolant (e.g., cool air, another gaseous coolant, and/or a liquid coolant) into the main container body via the one or more supply ducts and the at least one inlet. And within examples, based on the transformable assembly being in the aircraft configuration, the transformable cargo container also has a non-rectangular cross-sectional area and is configured to occupy a partially-circular cross-sectional storage area of a fuselage of an aircraft. Further, based on the transformable assembly being in the ground configuration, the refrigeration equipment is configured to supply coolant into the main container body via the one or more supply ducts and the at least one inlet. And within examples, based on the transformable assembly being in the ground configuration, the transformable cargo container is configured to occupy a rectangular cross-sectional storage area on a ground transportation vehicle.

Accordingly, the transformable cargo container can be efficiently transferred between ground and air transportation by transitioning the transformable assembly between the ground and air configurations. In addition, refrigeration can be maintained in both configurations such that breaks in the cold chain are minimized and any temperature-sensitive products stored in the transformable cargo container do not need to be unloaded between ground and air legs of a journey.

These and other improvements are described in more detail below. Implementations described below are for purposes of example. The implementations described below, as well as other implementations, may provide other improvements as well.

Referring now to the figures, FIG. 1 depicts a transformable cargo container 100, according to an example implementation. The various elements of the transformable cargo container 100 could be formed from one or more materials such as aluminum, steel, plastic, and/or another material. Furthermore, it will be understood that any of the elements shown in FIG. 1 can include parts that are not explicitly shown in FIG. 1.

The transformable cargo container 100 includes a main container body 102 and a transformable assembly 104. The main container body 102 can define a storage chamber therein, in which various items can be stored, such as temperature-sensitive products. In embodiments where the transformable cargo container 100 is a refrigerated cargo container, the main container body 102 includes at least one inlet 106, whereas embodiments in which the transformable cargo container 100 is a non-refrigerated cargo container, the at least one inlet 106 might not be present.

The transformable assembly 104 includes one or more supplemental containers 108. In embodiments where the transformable cargo container 100 is a refrigerated cargo container, the transformable assembly 104 also includes one or more supply ducts 110, and at least one of the one or more supplemental containers 108 is configured to house (e.g., store) refrigeration equipment 112 that is configured to control a temperature inside the main container body 102. Whereas, embodiments in which the transformable cargo container 100 is a non-refrigerated cargo container, the one or more supply ducts 110 might not be present, and the one or more supplemental containers 108 may or might not be configured to store additional items (e.g., additional goods that are being transported). For instance, in non-refrigerated embodiments, the one or more supplemental containers 108 can be configured to house cargo instead of the refrigeration equipment 112, and the associated supply duct(s), inlet(s), etc. of the refrigerated embodiments might not be present. Within alternative examples, in non-refrigerated embodiments, if the one or more supplemental containers 108 are designed to store the refrigeration equipment 112, the one or more supplemental containers 108 can be interchangeably replaced with other supplemental containers that are specifically designed to store cargo.

The refrigeration equipment 112 can take the form of a compressor (e.g., an internal combustion-powered compressor) or other temperature control device. In some embodiments, a gearing mechanism or other mechanism can be present in the one or more supplemental containers 108 that is configured to suspend the refrigeration equipment 112 so that the refrigeration equipment 112 is oriented in the same way regardless of how the one or more supplemental containers 108 are oriented during transition between the aircraft and ground configurations.

In some embodiments, a given one of the one or more supplemental containers 108 stores the refrigeration equipment 112 as well as cargo. In such embodiments, the refrigeration equipment 112 might not take up the whole volume of that supplemental container, and thus the refrigeration equipment 112 can also control the temperature in a portion of that supplemental container that carries cargo.

Within examples, the one or more supply ducts 110 includes a single supply duct operably connected to a particular inlet of the at least one inlet 106 and configured to facilitate the supply of coolant into the main container body 102 in both the ground and aircraft configuration. Within other examples, the one or more supply ducts 110 includes at least two supply ducts. Examples of each arrangement are described in more detail below. Further, within examples, the one or more supply ducts 110 are located inside the main container body 102 (e.g., coupled to an interior surface within the main container body 102), outside the main container body 102 (e.g., coupled to an exterior surface of the main container body 102), and/or built into at least one sidewall of the main container body 102.

Within examples, the transformable cargo container 100 includes one or more return ducts (not shown), which can be embedded in front and/or aft sidewalls of the main container body 102 or located elsewhere. Such return duct(s) can be configured to attach to the one or more supplemental containers 108 in both the ground and aircraft configurations. In alternative examples, the one or more supply ducts 110 also act as return ducts.

As described in more detail below, the transformable assembly 104 is operably coupled to the main container body 102 and positioned at an exterior of the main container body 102. The transformable assembly 104 is also used to facilitate storage of the transformable cargo container 100 in both aircraft and ground transportation vehicles, representative examples of which are depicted in FIG. 1 as aircraft 114 and ground transportation vehicle 116.

To facilitate this, the transformable assembly 104 is movable between an aircraft configuration and a ground configuration, thereby effectively putting the transformable cargo container 100 in the aircraft configuration and the ground configuration, respectively. Based on the transformable assembly 104 being in the aircraft configuration, the refrigeration equipment 112 is configured to supply coolant into the main container body 102 via the one or more supply ducts 110 and the at least one inlet 106. And based on the transformable assembly 104 being in the ground configuration, the refrigeration equipment 112 is configured to supply coolant into the main container body 102 via the one or more supply ducts 110 and the at least one inlet 106.

Additionally, in both refrigerated and non-refrigerated cargo container embodiments, the transformable cargo container 100 has a non-rectangular cross-sectional area and is configured to occupy a partially-circular cross-sectional storage area of a fuselage of the aircraft 114 when the transformable assembly 104 is in the aircraft configuration. And when the transformable assembly 104 is in the ground configuration, the transformable cargo container 100 is configured to occupy a rectangular cross-sectional storage area on a ground transportation vehicle 116 (e.g., on a truck bed). The size and shape of the one or more supplemental containers 108 can be selected based on one or more dimensions (e.g., a width) of a partially-circular cross-sectional storage area of the aircraft 114 and/or of a rectangular cross-sectional storage area on the ground transportation vehicle 116. In some situations, the dimensions of the rectangular cross-sectional storage area substantially conform to dimensions of a non-transformable intermodal container (e.g., 8 feet wide and 8 or 9.5 feet high).

The aircraft 114 can take the form of various types of aircraft, such as commercial or non-commercial aircraft. The ground transportation vehicle 116 can take various forms as well, such as a truck, train, or cargo ship.

The transformable assembly 104 can be operably coupled to the main container body 102 in various ways. For example, the transformable assembly 104 can be rotatably coupled by way of a hinge, track, pivot pin, and/or other mechanism(s). Other examples are possible as well.

Figure 2:
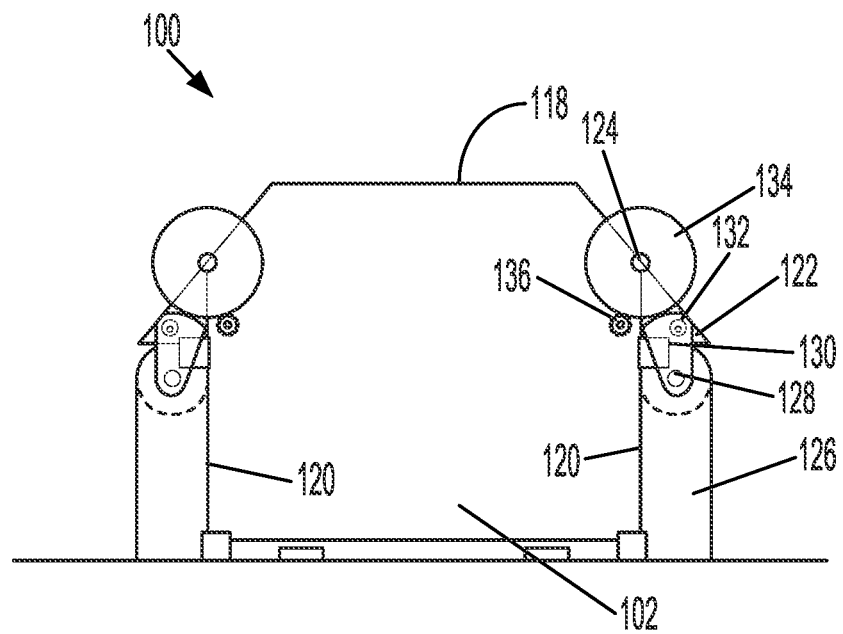
FIG. 2 depicts a transformable cargo container in an aircraft configuration, according to an example implementation.

FIGS. 2-15 next depict example embodiments of the transformable cargo container 100 in which, based on the transformable assembly 104 being in the aircraft configuration, the one or more supplemental containers 108 are positioned at one or both lateral sidewalls of the main container body 102, and also, based on the transformable assembly 104 being in the ground configuration, the one or more supplemental containers 108 are positioned on top of the main container body 102. For reference, the top 118 and lateral sidewalls 120 of an example of the main container body 102 are indicated in FIG. 2.

FIGS. 2-6 first depict an example embodiment of the transformable cargo container 100 in which the one or more supplemental containers 108 include a first container 122 rotatably coupled to the main container body 102 via a first hinge 124 and a second container 126 rotatably coupled to the first container 122 via a second hinge 128, a bracket 130, and a drive mechanism 132. The drive mechanism 132 can be or include one or more gears, motors, socket wrenches, tools, controllers, or other mechanisms.

In addition, the main container body 102 has chamfered corners. Although the arrangement of FIGS. 2-6 is shown on both a left lateral sidewall and a right lateral sidewall of the lateral sidewalls 120 of the main container body 102, only the arrangement on the right is denoted for simplicity.

In this embodiment, the first hinge 124 is configured to couple to a sprocket 134, and the transformable assembly 104 also includes a drive gear 136 coupled to the main container body 102 (i.e., an exterior surface of the main container body 102, such as a longitudinal sidewall of the main container body 102) and configured to couple to the sprocket 134 and move the transformable assembly 104 between the aircraft and ground configurations based on movement of the sprocket 134. As such, when it is time to move the transformable assembly 104 between the aircraft and ground configurations, the sprocket 134 can be coupled to the first hinge 124 and the drive gear 136 can be moved (i.e., rotated), such as using a human-operated hand crank or autonomous mechanism, thereby causing movement of the transformable assembly 104 between the aircraft and ground configurations. In addition, the drive mechanism 132 can be rotated as well in a similar manner to assist with moving the transformable assembly 104 between the aircraft and ground configurations.

Figure 4:
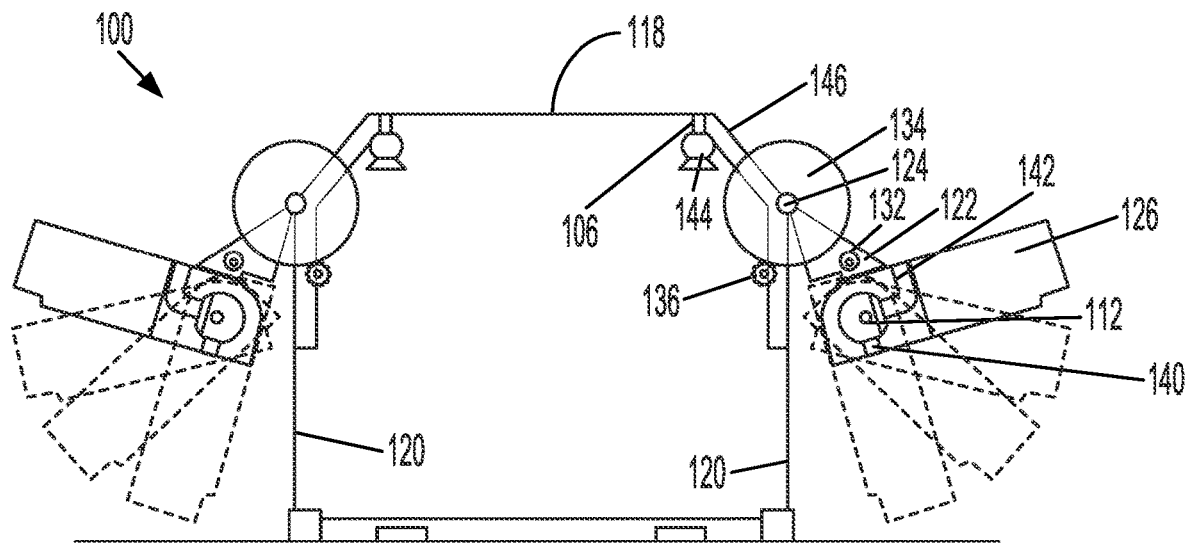
FIG. 4 depicts a transformable cargo container in an intermediate position between an aircraft configuration and a ground configuration, according to an example implementation.
Figure 5:
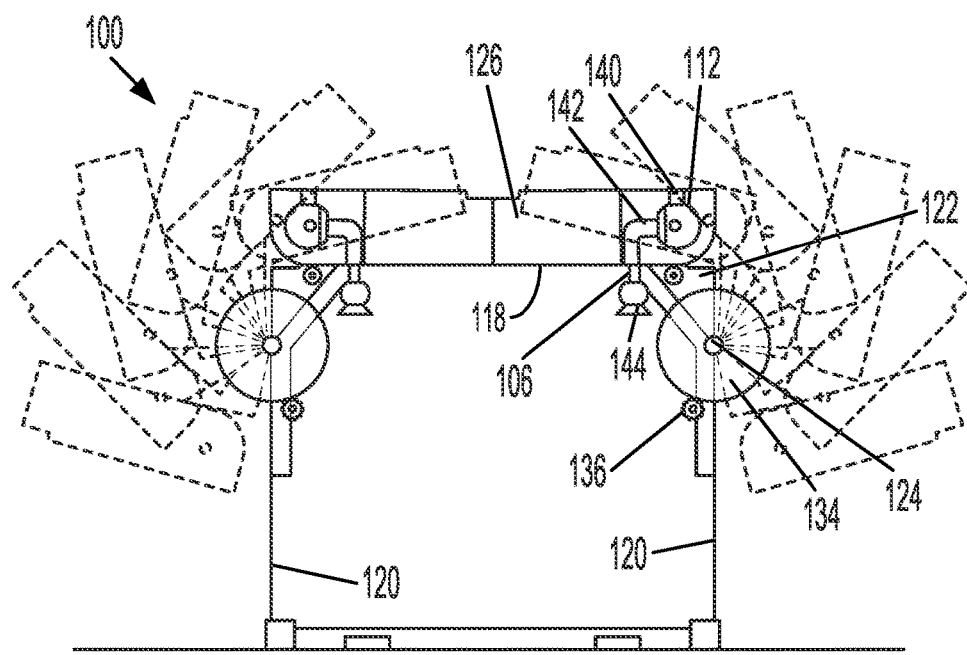
FIG. 5 depicts a transformable cargo container in a ground configuration, according to an example implementation.

FIG. 2 depicts the transformable cargo container 100 in the aircraft configuration, and with the sprocket 134 coupled to the first hinge 124. While the embodiment of FIG. 2 is not a refrigerated embodiment, the refrigeration equipment 112 can be included in the second container 126, as shown in FIGS. 3-5.

Figure 3:
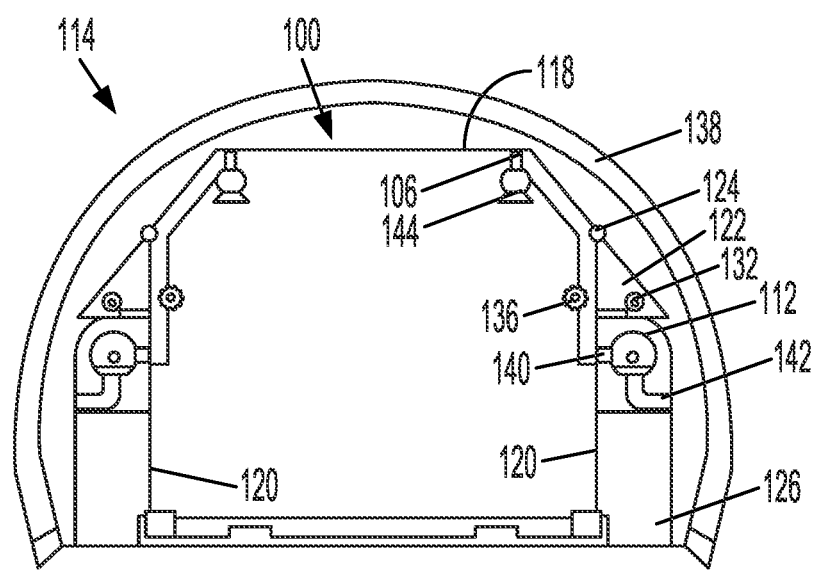
FIG. 3 depicts a transformable cargo container in an aircraft configuration and stored in a fuselage of an aircraft, according to an example implementation.

FIG. 3 depicts a refrigerated embodiment of the transformable cargo container 100 that is in the aircraft configuration and stored in a fuselage 138 of the aircraft 114. As shown, the fuselage 138 has a partially-circular cross-sectional storage area, with boundaries defined in part by the curved interior surface of the fuselage 138.

In FIG. 3, the one or more supply ducts 110 take the form of a first supply duct 140 and a second supply duct 142, each disposed at least partially within the one or more supplemental containers 108—namely, within the second container 126. As shown, the at least one inlet 106 takes the form of a duct disposed within the interior of the main container body 102, the duct having one inlet at the top 118 of the main container body 102 and another inlet at the right sidewall of the lateral sidewalls 120.

As so arranged, based on the transformable assembly 104 being in the aircraft configuration shown in FIG. 3, the refrigeration equipment 112 is configured to supply coolant into the main container body 102 via the first supply duct 140 and the at least one inlet 106. And based on the transformable assembly 104 being in the ground configuration (as shown in FIG. 5), the refrigeration equipment 112 is configured to supply coolant into the main container body 102 via the second supply duct 142 and the at least one inlet 106.

Within examples, the transformable cargo container 100 can also include at least one coolant diffuser 144 coupled to the at least one inlet 106 and positioned within the main container body 102. In alternative examples, other mechanisms for distributing coolant into the main container body 102 can be used instead of a coolant diffuser, such as a plurality of holes disposed in the one or more supply ducts 110 or a plenum.

In the aircraft configuration shown in FIG. 3, the first supply duct 140 connects to the at least one inlet 106 at the right sidewall of the lateral sidewalls 120 and facilitates the supply of coolant into the main container body 102 via the at least one coolant diffuser 144.

Example movement from the aircraft configuration to the ground configuration will now be described and illustrated with respect to FIGS. 4 and 5.

To facilitate movement from the aircraft configuration to the ground configuration, the teeth of the sprocket 134 mesh with the drive gear 136, and the drive gear 136 is rotated manually by means of a socket wrench, by a socket drive connected to an electrical motor, or by another means. The center of the sprocket 134 is rigidly connected to a portion of the first container 122 such that as the sprocket 134 rotates, the first container 122 also rotates the same amount about the first hinge 124. Further, the bracket 130 rigidly couples the second container 126 to the first container 122 so that the second container 126 substantially follows the same rotational motion of the first container 122. In alternative arrangements, the first container 122 can take the form of a bracket connecting the drive gear 136 to the sprocket 134.

The sprocket 134 is first rotated approximately 15 degrees so that the first container 122 and the second container 126 also rotate 15 degrees together about the first hinge 124, so as to provide some clearance for a subsequent rotation about the first hinge 124 and so the second container 126 will not scrape up against the nearby sidewall of the main container body 102. The drive gear 136 is then locked at 15 degrees and the second container 126 is then rotated counterclockwise relative to the first container 122 via manual (e.g., a hand crank) or electric operation of the drive mechanism 132. Although not explicitly shown, the drive mechanism 132 can include one or more linked gears disposed at least partially within the first container 122, one of which is coupled to the second hinge 128. The second container 126 is rotated approximately 90 degrees relative to the first container 122, at which point the second container 126 can be locked relative to the first container 122.

FIG. 4 depicts movement of the transformable assembly 104 to an intermediate position between the aircraft configuration and the ground configuration—namely, the position in which the second container 126 is rotated approximately 90 degrees relative to the first container 122 as indicated above.

Once the second container 126 is rotated approximately 90 degrees relative to the first container 122, the first container 122 and the second container 126 are together rotated about the first hinge 124 until the first container 122 contacts a chamfered corner 146 of the main container body 102 and the second container 126 contacts the top 118 (i.e., a top/upper surface) of the main container body 102. At this point, the second supply duct 142 aligns with the at least one inlet 106 so that the refrigeration equipment 112 can supply coolant into the main container body 102.

FIG. 5 depicts movement of the transformable assembly 104 from the intermediate position of FIG. 4 to the ground configuration. In the ground configuration, the second supply duct 142 connects to the at least one inlet 106 at the top 118 of the main container body 102 and facilitates the supply of coolant into the main container body 102 via the at least one coolant diffuser 144.

Figure 6:
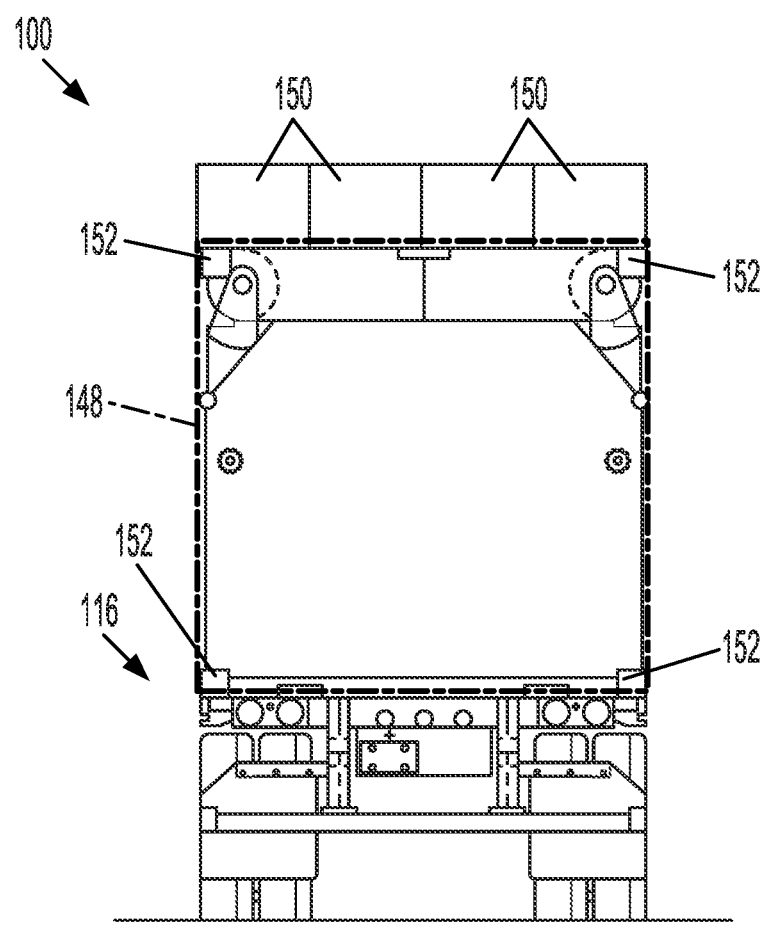
FIG. 6 depicts a transformable cargo container in a ground configuration and stored on a ground transportation vehicle, according to an example implementation.

FIG. 6 next depicts the transformable assembly 104 in the ground configuration and a non-refrigerated version of the transformable cargo container 100 stored on the ground transportation vehicle 116, which takes the form of a truck bed. As shown, the transformable cargo container 100 occupies a rectangular cross-sectional storage area 148 on the ground transportation vehicle 116, which is designated in FIG. 6 as a rectangular box with dashed lines. As further shown, within some examples, additional containers 150 can be stored on top of the transformable cargo container 100 when the transformable assembly 104 is in the ground configuration.

Additionally, indicated in FIG. 6 and shown in various other Figures herein are corner fittings 152. The corner fittings 152 can be made of steel, carbon, or another material, and can be configured to (i) connect the transformable cargo container 100 to another container, such as another transformable cargo container 100 or another type of cargo container (e.g., additional containers 150) and (ii) connect the transformable cargo container 100 to a transport vehicle such as the aircraft 114 or the ground transportation vehicle 116. Within examples, the one or more supplemental containers 108 have the corner fittings 152 as well.

FIGS. 7-15 next depict an example embodiment of the transformable cargo container 100 in which the main container body 102 comprises a track 154 disposed on a longitudinal sidewall 156 of the main container body 102, and the one or more supplemental containers 108 include a fulcrum box 158. The fulcrum box 158 is positioned at a lateral sidewall (e.g., the right lateral sidewall of the two lateral sidewalls 120) of the main container body 102 and is slidably and pivotably coupled to the track 154. Although the arrangement of FIGS. 7-15 is shown on both the left lateral sidewall and the right lateral sidewall of the lateral sidewalls 120 of the main container body 102, only the arrangement on the right is denoted for simplicity.

When the transformable cargo container 100 of FIGS. 7-15 has been moved from the aircraft configuration to the ground configuration, the transformable cargo container 100 occupies the rectangular cross-sectional storage area 148 on the ground transportation vehicle 116 (not shown).

Figure 7:
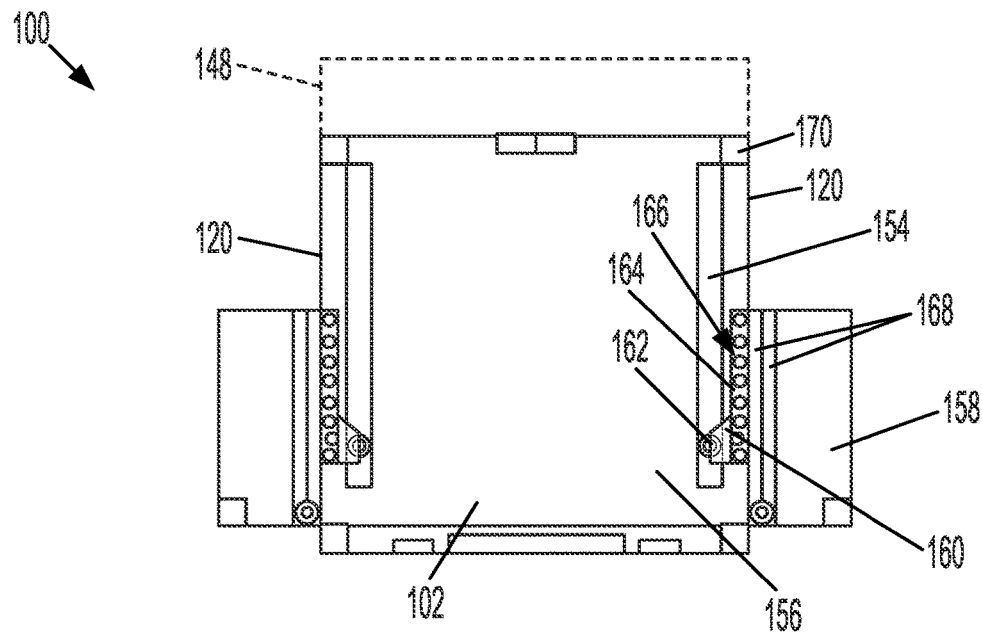
FIG. 7 depicts a transformable cargo container in an aircraft configuration, according to an example implementation.

FIG. 7 depicts the transformable cargo container 100 in the aircraft configuration. While the embodiment of FIG. 7 is not a refrigerated embodiment, the refrigeration equipment 112 can be included in the fulcrum box 158, as shown in FIG. 8-14. The rectangular cross-sectional storage area 148 is designated in FIG. 7, for instance, which is not occupied in FIG. 7 since the transformable cargo container 100 is in the aircraft configuration, but will be occupied when in the ground configuration (e.g., in FIG. 14).

The fulcrum box 158 is slidably and pivotably coupled to the track 154 by way of a bracket 160, as well as a roller pin 162 coupled to the bracket 160 and configured to slide within the track 154 and pivot the fulcrum box 158. The bracket 160 is also coupled to a frame 164 that holds a plurality of rollers 166 (depicted as black dots) that facilitates linear movement of the fulcrum box 158 relative to the frame 164. Further, the frame 164 is coupled to a C-channel (not explicitly shown in FIG. 7, but shown in FIG. 13), which is in turn coupled to (or integral with one panel of) a plurality of hinged panels 168. The C-channel and the plurality of hinged panels 168 couple the fulcrum box 158 to the frame 164. The plurality of hinged panels 168 are configured to move the fulcrum box between a retracted position in which the fulcrum box 158 is retracted inward towards the main container body 102 and an extended position in which the fulcrum box 158 is extended outward away from the main container body 102. In FIG. 7, the fulcrum box 158 is in the extended position.

Based on the fulcrum box 158 being in the extended position, the fulcrum box 158 is configured to move around a top corner 170 of the main container body 102. That is, the plurality of hinged panels 168 are configured to help the fulcrum box 158 clear the top corner 170 when the fulcrum box 158 is moved between the aircraft and ground configurations. As such, in alternative embodiments in which the main container body 102 has chamfered top corners, the plurality of hinged panels 168 might not be included.

Figure 8:
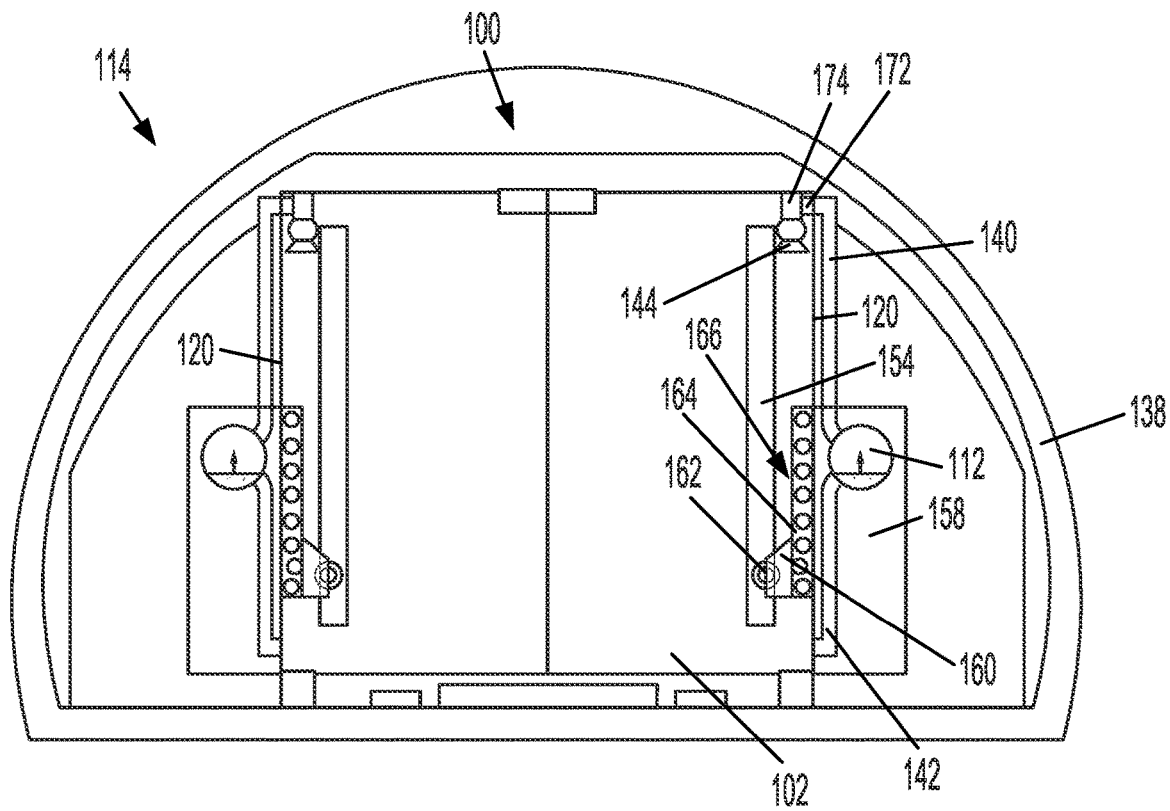
FIG. 8 depicts a transformable cargo container in an aircraft configuration and stored in a fuselage of an aircraft, according to an example implementation.

FIG. 8 depicts a refrigerated embodiment of the transformable cargo container 100 that is in the aircraft configuration and stored in the fuselage 138 of the aircraft 114. In addition, the fulcrum box 158 is in the retracted position.

In FIG. 8, the one or more supply ducts 110 take the form of the first supply duct 140 and the second supply duct 142, each disposed at least partially within the fulcrum box 158. As shown, a portion of the first supply duct 140 is disposed in an interior of the fulcrum box 158 and a remaining portion of the first supply duct 140 is disposed exterior to the main container body 102 and the fulcrum box 158. Further, an entirety of the second supply duct 142 is disposed in the interior of the fulcrum box 158.

Within examples, the one or more supply ducts 110 are movable between an extended position outside of the one or more supplemental containers 108 and a retracted position inside the one or more supplemental containers 108. More specifically, in this particular embodiment, the first supply duct 140 is retractable. In FIG. 8, the first supply duct 140 is shown in the extended position, where it connects the refrigeration equipment 112 to a first inlet 172 and facilitates the supply of coolant into the main container body 102 via the at least one coolant diffuser 144 when the transformable cargo container 100 is in the aircraft configuration. In order to transition to the ground configuration, the first supply duct 140 is retracted to the retracted position, and once in the ground configuration, the second supply duct 142 connects the refrigeration equipment 112 to a second inlet 174 and facilitates the supply of coolant into the main container body 102 via the at least one coolant diffuser 144.

Example movement from the aircraft configuration to the ground configuration will now be described and illustrated with respect to FIGS. 9-14. The movement described with respect to this embodiment can be accomplished manually or at least partially autonomously via a drive mechanism or combination of drive mechanisms.

Figure 9:
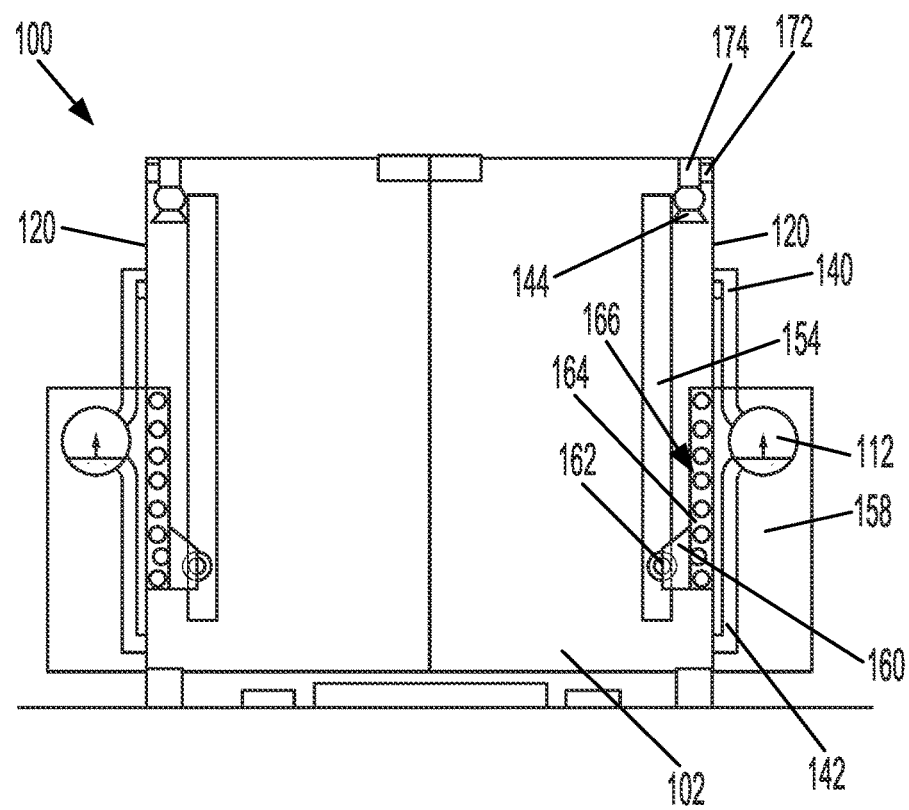
FIG. 9 depicts a transformable cargo container in an intermediate position between an aircraft configuration and a ground configuration, according to an example implementation.

FIG. 9 depicts the first supply duct 140 being retracted from the extended position towards the retracted position. The fulcrum box 158 is in the retracted position as well.

Figure 10:
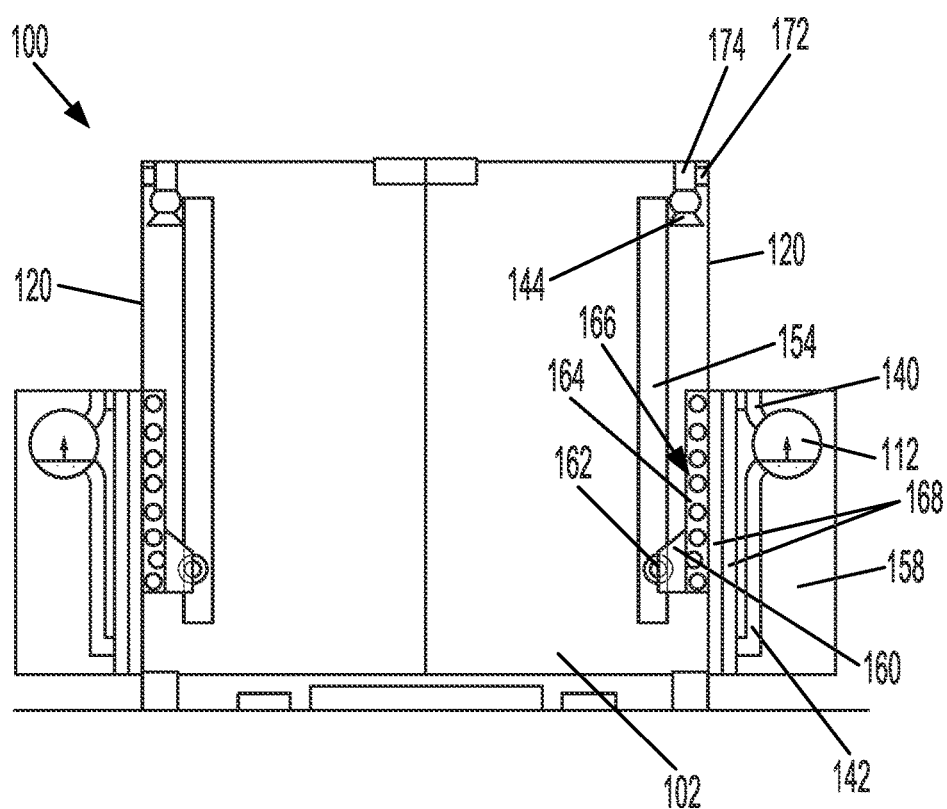
FIG. 10 depicts a transformable cargo container in another intermediate position between an aircraft configuration and a ground configuration, according to an example implementation.

FIG. 10 depicts the first supply duct 140 having been fully retracted. In addition, the fulcrum box 158 has been moved outward into the extended position.

Figure 11:
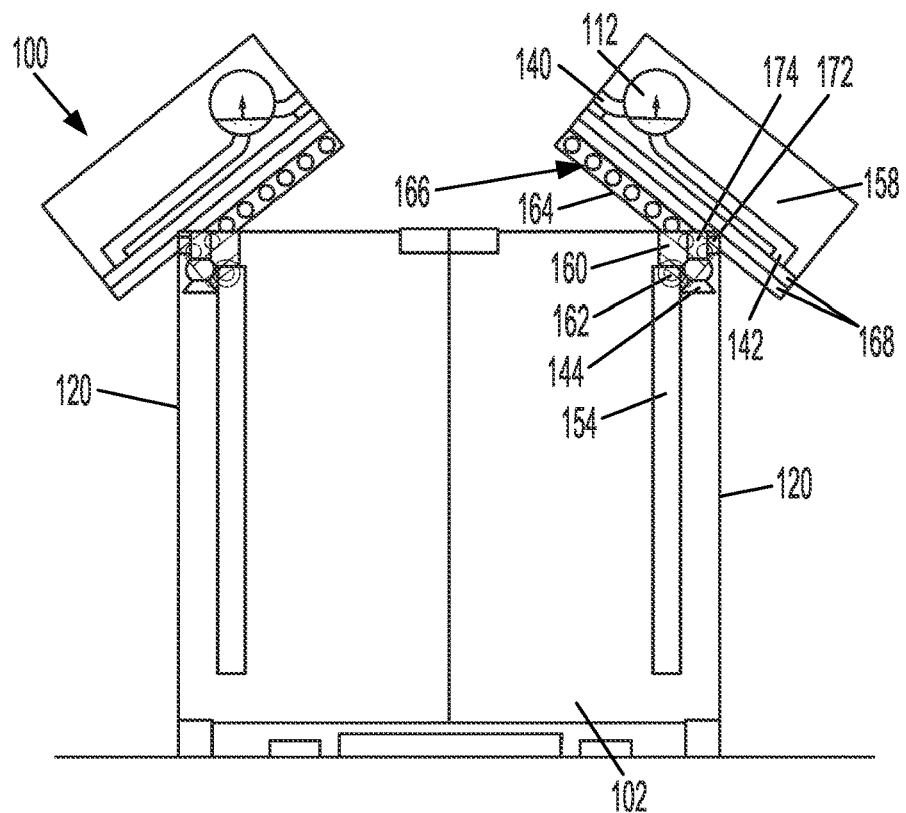
FIG. 11 depicts a transformable cargo container in another intermediate position between an aircraft configuration and a ground configuration, according to an example implementation.

FIG. 11 depicts the fulcrum box 158 having been raised to the end of the track 154, at which point the fulcrum box 158 is rotated about an axis defined by the roller pin 162. Because the fulcrum box 158 is in the extended position, it can clear the top corner 170.

Figure 12:
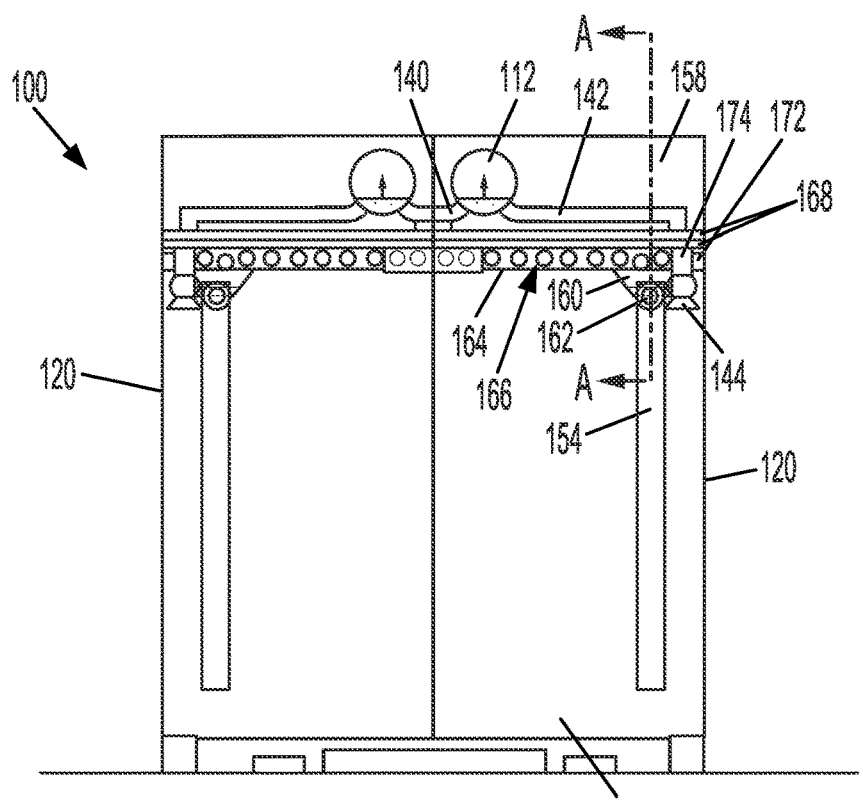
FIG. 12 depicts a transformable cargo container in another intermediate position between an aircraft configuration and a ground configuration, according to an example implementation.

FIG. 12 depicts the fulcrum box 158 still in the extended position and having been moved laterally towards a center of the transformable cargo container 100.

Figure 13:
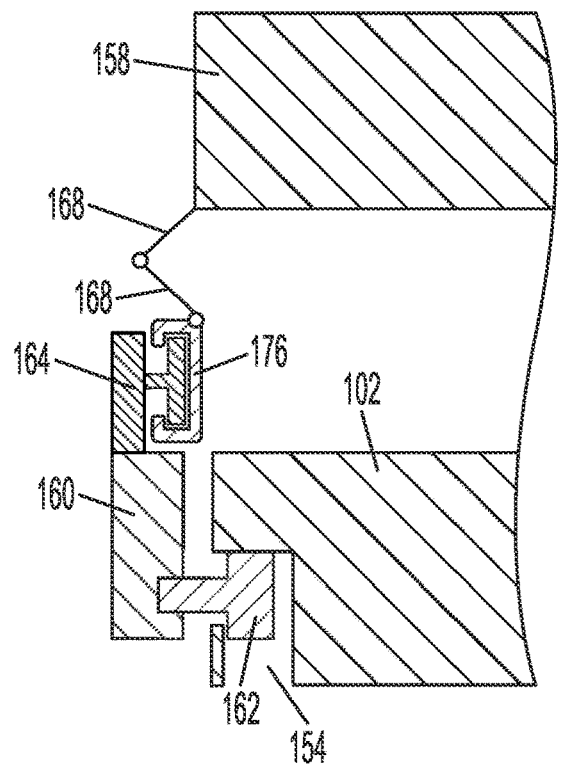
FIG. 13 depicts a transformable cargo container in another intermediate position between an aircraft configuration and a ground configuration, according to an example implementation.

FIG. 13 depicts a cross-sectional view of the transformable cargo container 100 taken along line A-A, but with the plurality of hinged panels 168 being retracted so as to bring the fulcrum box 158 from the extended position to the retracted position. Also shown is a C-channel 176 to which the plurality of hinged panels 168 are hingedly coupled and to which the frame 164 is coupled.

Figure 14:
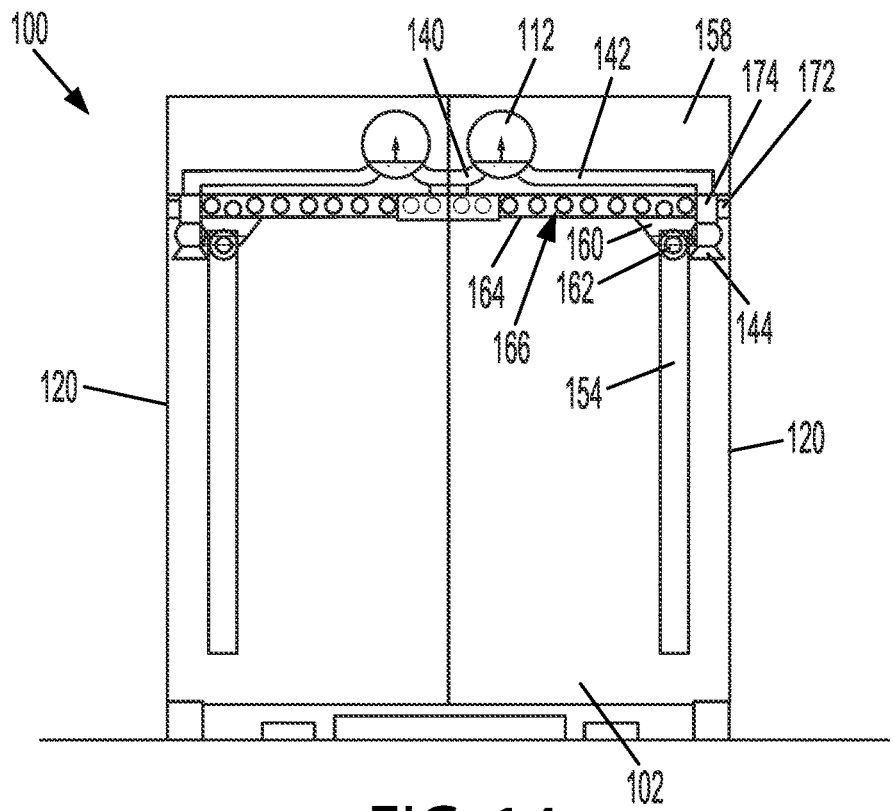
FIG. 14 depicts a transformable cargo container in a ground configuration, according to an example implementation.

FIG. 14 depicts the transformable cargo container 100 in the ground configuration. The fulcrum box 158 is in the retracted position and the second supply duct 142 connects the refrigeration equipment 112 to the second inlet 174. Although not explicitly shown, the fulcrum box 158 can also be coupled (e.g., latched) to the main container body 102 to prevent movement of the fulcrum box 158 (e.g., until it is time to transition back to the aircraft configuration). In embodiments such as that shown in FIG. 14 where there are two fulcrum boxes, the two boxes can be latched or otherwise coupled together on top of the main container body 102 so as to maintain the transformable cargo container 100 in the ground configuration, by providing a load path that improves stiffness and strength of the transformable cargo container 100 in the ground configuration.

Although the track 154 is depicted in FIGS. 7-14 as a linear track that extends vertically towards a top of the main container body 102, in alternative embodiments the track 154 can include a horizontal portion proximate to the top of the main container body 102, so as to approximately form a right-angled track that facilitates movement of the fulcrum box 158 toward the position illustrated in FIGS. 12 and 14. In such an alternative embodiment, the track 154 can eliminate the need for at least the frame 164 and the plurality of rollers 166.

In some situations, based on the transformable assembly 104 being in the ground configuration, another container (or multiple other containers) is/are stackable on top of the fulcrum box 158. An example of this is shown in FIG. 15.

Figure 15:
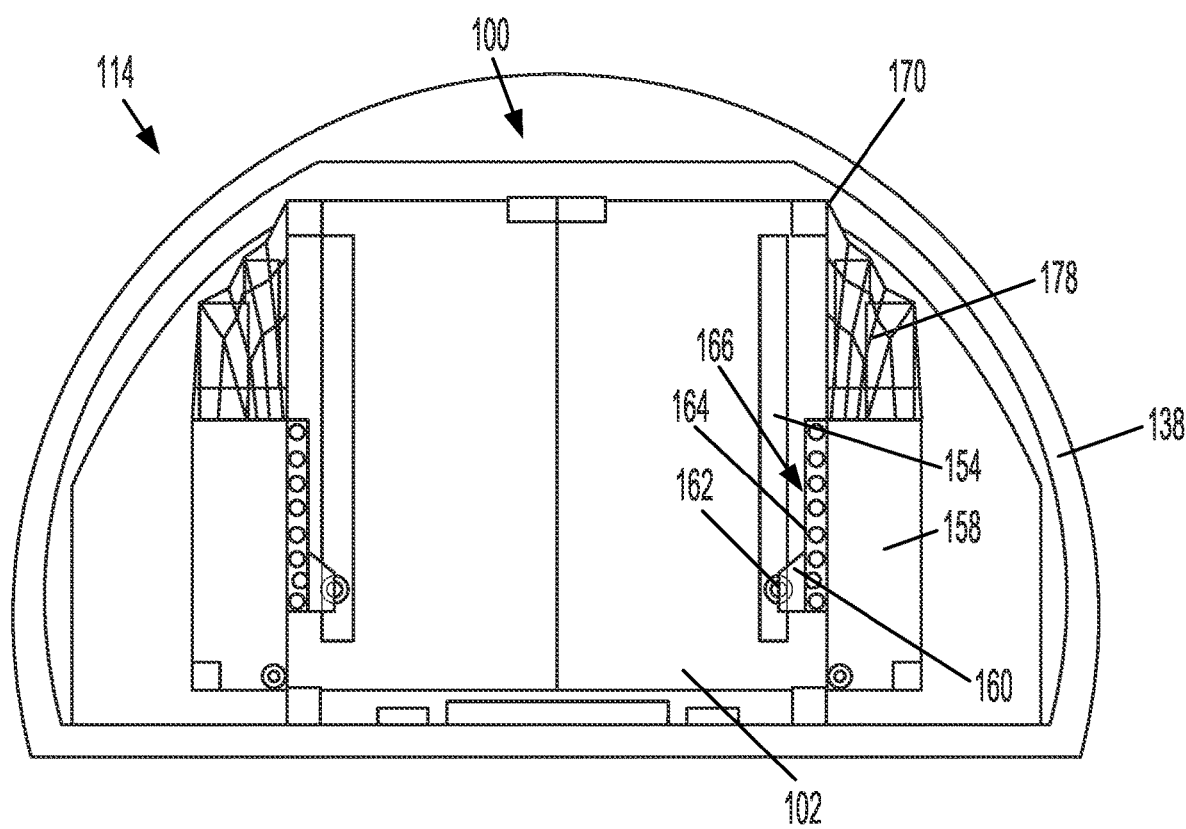
FIG. 15 depicts a transformable cargo container in an aircraft configuration and stored in a fuselage of an aircraft with other cargo stacked thereon, according to an example implementation.

FIG. 15 depicts a non-refrigerated embodiment of the transformable cargo container 100, as similarly shown in FIG. 7, in which based on the transformable assembly 104 being in the ground configuration, a plurality of other cargo 178 are stacked on the fulcrum box 158 and secured with a cargo net 180.

FIGS. 16-29 next depict example embodiments of the transformable cargo container 100 in which the one or more supplemental containers 108 are positioned on top of (or otherwise relative to the same exterior surface of) the main container body 102 in both the aircraft and ground configurations. That is, based on the transformable assembly 104 being in the aircraft configuration, the one or more supplemental containers 108 are positioned on top of the main container body 102, and also, based on the transformable assembly 104 being in the ground configuration, the one or more supplemental containers 108 are positioned on top of the main container body 102.

Moreover, the main container body 102 depicted in each of FIGS. 16-29 has a cross-sectional area that has a non-rectangular, stepped polygon shape, which can maximize the volume of the transformable cargo container 100 while still fitting in the fuselage 138 of the aircraft 114.

Figure 17:
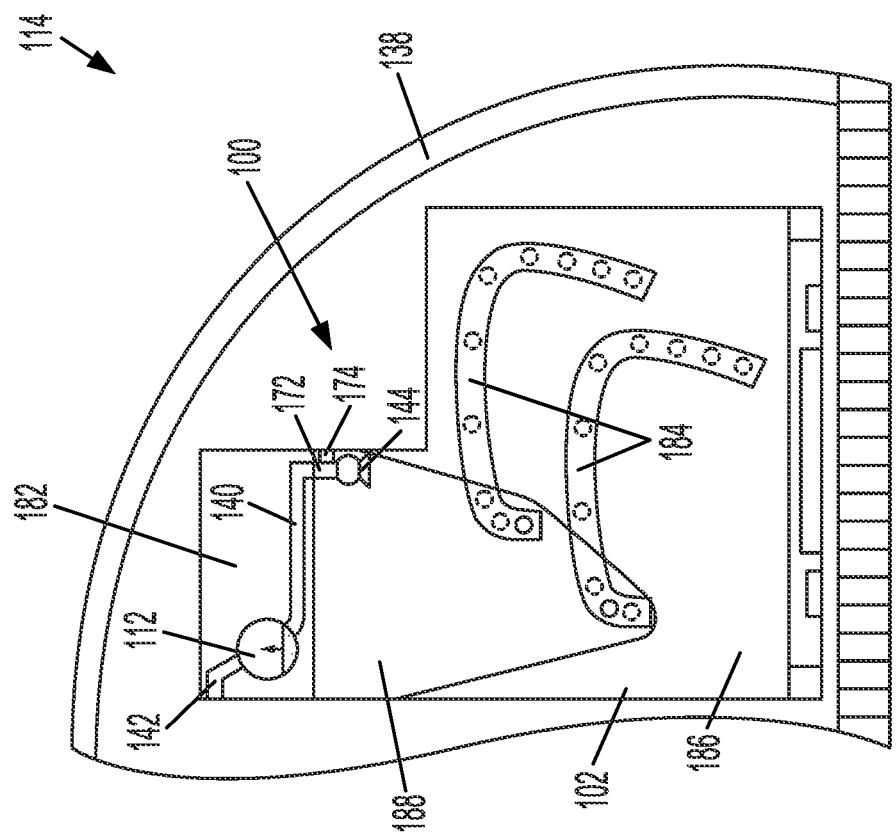
FIG. 17 depicts a transformable cargo container in an aircraft configuration and stored in a fuselage of an aircraft, according to an example implementation.
Figure 16:
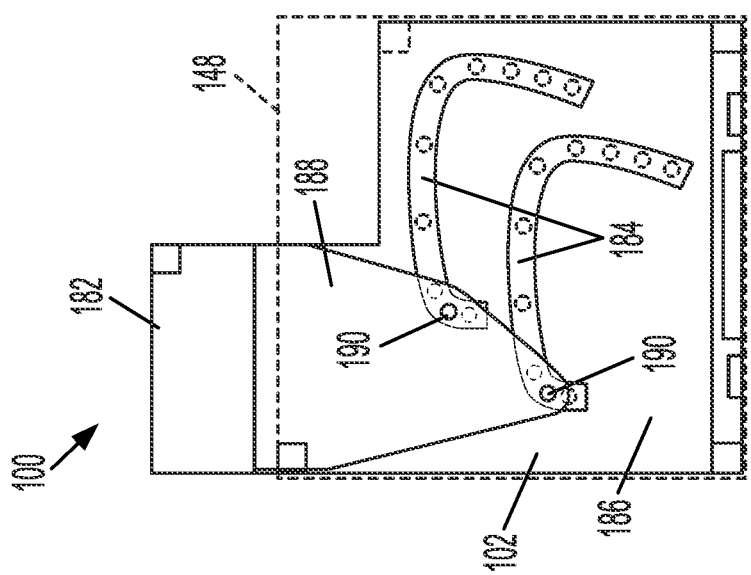
FIG. 16 depicts a transformable cargo container in an aircraft configuration, according to an example implementation.
Figure 18:
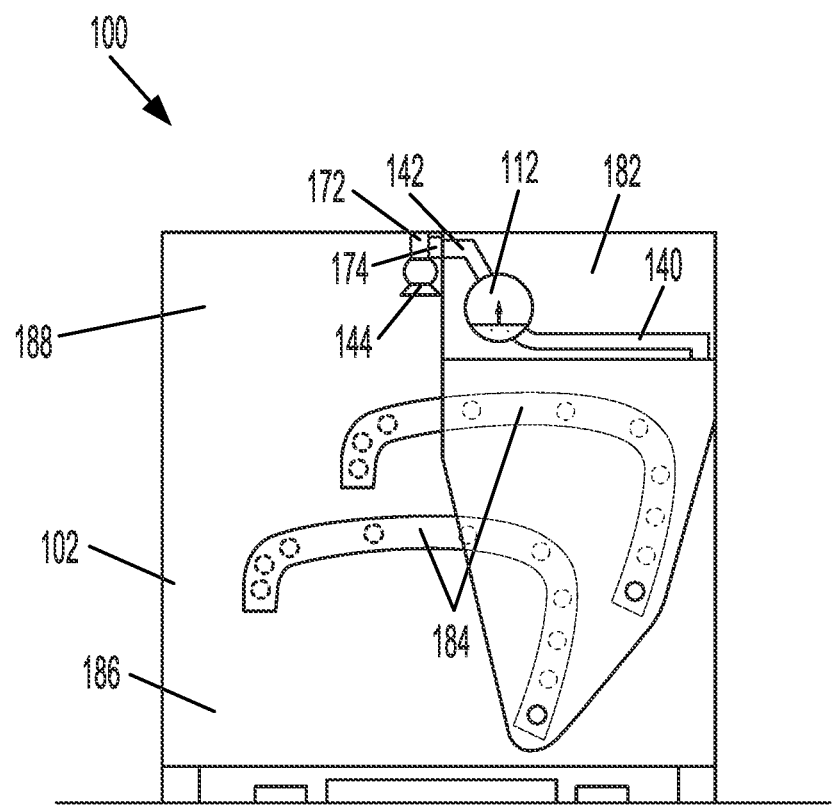
FIG. 18 depicts a transformable cargo container in a ground configuration, according to an example implementation.

FIGS. 16-18 first depict an example embodiment of the transformable cargo container 100 in which the one or more supplemental containers 108 includes a swing box 182, the main container body 102 includes a plurality of tracks 184 disposed on a longitudinal sidewall 186 of the main container body 102, and the transformable assembly 104 includes a support structure 188 that is coupled to the swing box 182 and configured to move along the plurality of tracks 184. Although not explicitly shown, the other longitudinal sidewall of the main container body 102, opposite to longitudinal sidewall 186, includes another plurality of tracks, similar to the plurality of tracks 184 shown in FIGS. 16-18, and the support structure 188 is configured to move along that other plurality of tracks as well.

The support structure 188 is supported at two locations by a plurality of pins 190 (or rollers) that fit inside the plurality of tracks 184. The load in the swing box 182 is transferred into the support structure 188, into the plurality of pins 190, into the plurality of tracks 184, and then into the longitudinal sidewalls of the main container body 102.

FIG. 16 depicts the transformable cargo container 100 in an intermediate position between the aircraft configuration and the ground configuration. Ten positions are labeled along the plurality of tracks 184, with position "1" corresponding to the aircraft configuration. Position "10" corresponds to the ground configuration, in which case the transformable cargo container 100 occupies the rectangular cross-sectional storage area 148 on the ground transportation vehicle 116 (not shown). As shown, the support structure 188 is at position "2". While the embodiment of FIG. 16 is not a refrigerated embodiment, the refrigeration equipment 112 can be included in the swing box 182, as shown in FIGS. 17-18.

FIG. 17 depicts a refrigerated embodiment of the transformable cargo container 100 that is in the aircraft configuration and stored in the fuselage 138 of the aircraft 114. The first supply duct 140 and the second supply duct 142 are each disposed within the swing box 182. Further, in FIG. 17, the first supply duct 140 connects the refrigeration equipment 112 to the first inlet 172 and facilitates the supply of coolant into the main container body 102 via the at least one coolant diffuser 144 when the transformable cargo container 100 is in the aircraft configuration.

FIG. 18 depicts the refrigerated embodiment of the transformable cargo container 100 that is in the ground configuration. In the ground configuration, the second supply duct 142 connects the refrigeration equipment 112 to the second inlet 174 and facilitates the supply of coolant into the main container body 102 via the at least one coolant diffuser 144.

As an example advantage of the swing box 182 embodiment, the "up" direction for the refrigeration equipment 112 and/or cargo in the swing box 182 remains up for the complete duration of the trip between the aircraft and ground configurations, which is particular advantageous when transporting orientation-sensitive cargo such as flowers or fragile products.

Figure 20:
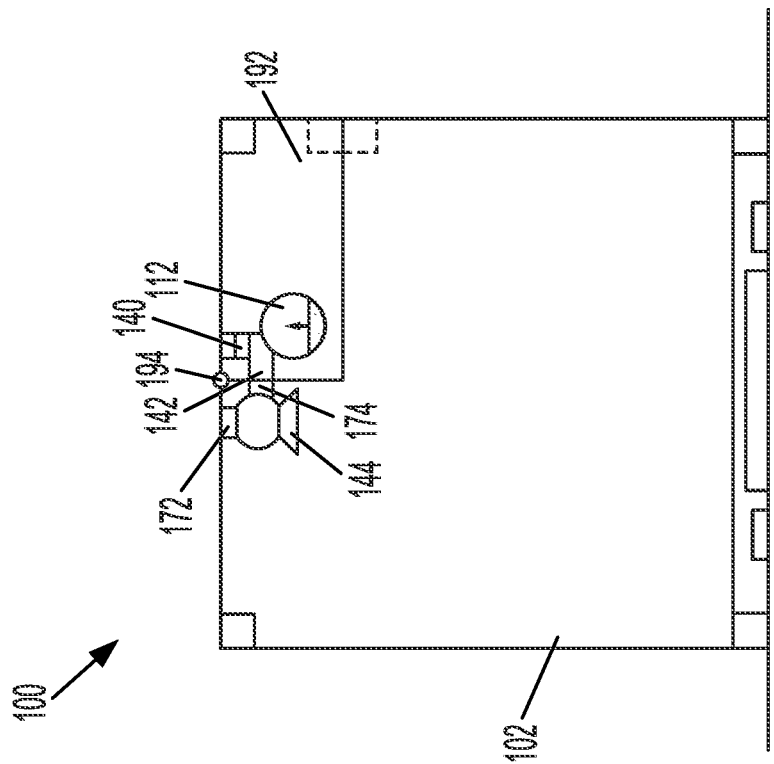
FIG. 20 depicts a transformable cargo container in a ground configuration, according to an example implementation.
Figure 19:
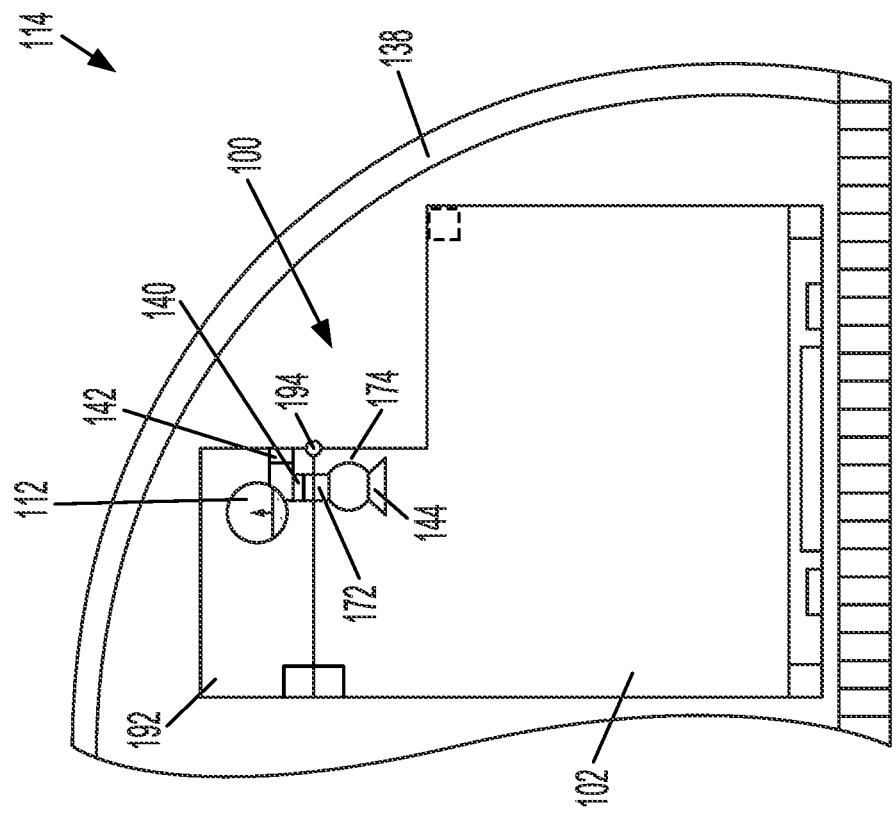
FIG. 19 depicts a transformable cargo container in an aircraft configuration and stored in a fuselage of an aircraft, according to an example implementation.
Figure 21:
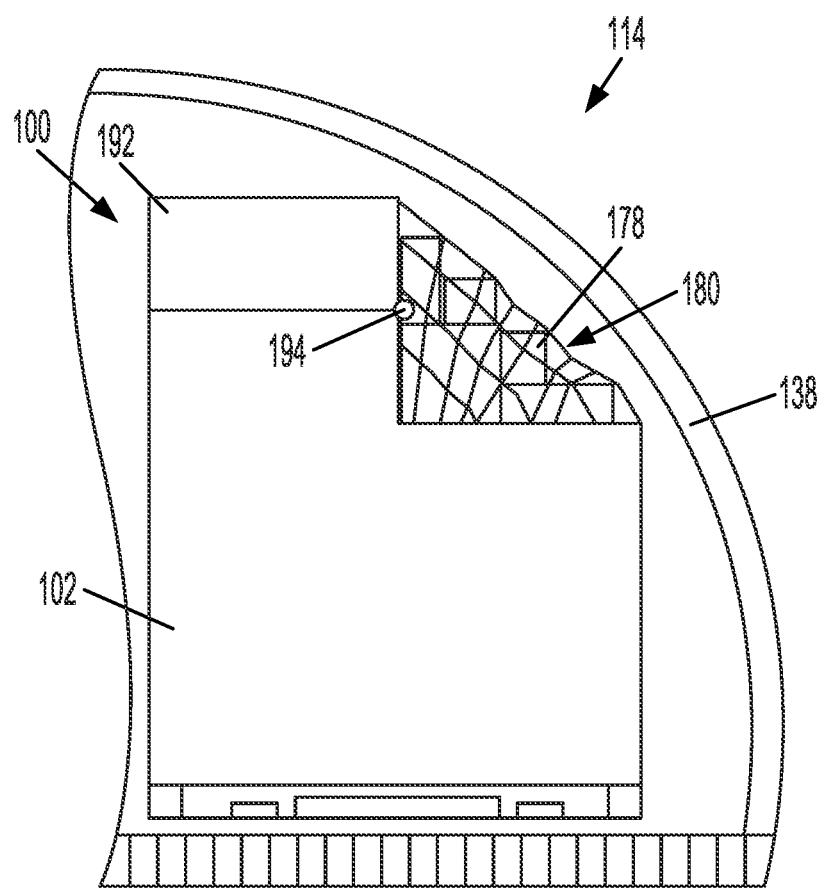
FIG. 21 depicts a transformable cargo container in an aircraft configuration and stored in a fuselage of an aircraft with other cargo stacked thereon, according to an example implementation.

FIGS. 19-21 next depict an example refrigerated embodiment of the transformable cargo container 100 in which the one or more supplemental containers 108 includes a hinge box 192 rotatably coupled to the top of the main container body 102 via a hinge 194.

FIG. 19 depicts the transformable cargo container 100 in the aircraft configuration and stored in the fuselage 138 of the aircraft 114. The first supply duct 140 and the second supply duct 142 are each disposed within the hinge box 192. Further, with the transformable cargo container 100 in the aircraft configuration, the first supply duct 140 connects the refrigeration equipment 112 to the first inlet 172 and facilitates the supply of coolant into the main container body 102 via the at least one coolant diffuser 144.

FIG. 20 depicts the transformable cargo container 100 in the ground configuration, after the hinge box 192 has rotated clockwise about the hinge 194. With the transformable cargo container 100 in the ground configuration, the second supply duct 142 connects the refrigeration equipment 112 to the second inlet 174 and facilitates the supply of coolant into the main container body 102 via the at least one coolant diffuser 144. In some scenarios, other containers can be stacked on the transformable cargo container 100 when the transformable cargo container 100 is in the ground configuration.

FIG. 21 depicts the transformable cargo container 100 in the aircraft configuration and stored in the fuselage 138. Within examples, and as shown, based on the transformable assembly 104 being in the aircraft configuration, the plurality of other cargo 178 are stacked on the main container body 102 and secured with the cargo net 180.

FIGS. 22-29 next depict example embodiments of the transformable cargo container 100 in which the main container body 102 includes plurality of tracks 196 (e.g., slide rails) disposed at least on the top 118 of the main container body 102, and the one or more supplemental containers 108 include a slide box 198 configured to move laterally along the plurality of tracks 196. As in other embodiments of the one or more supplemental containers 108 described herein, dimensions (e.g., a width) of the slide box 198 are selected based on a width of a partially-circular cross-sectional storage area of the fuselage 138 of the aircraft 114.

Figure 29:
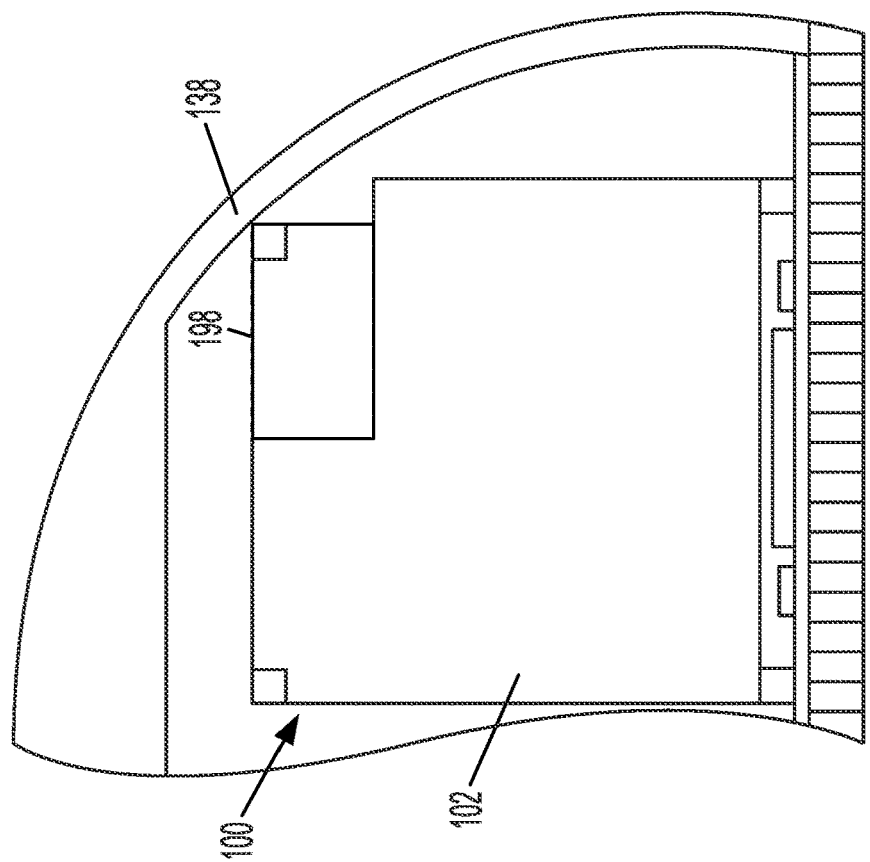
FIG. 29 depicts a transformable cargo container in an aircraft configuration and stored in a fuselage of an aircraft, according to an example implementation.
Figure 28:
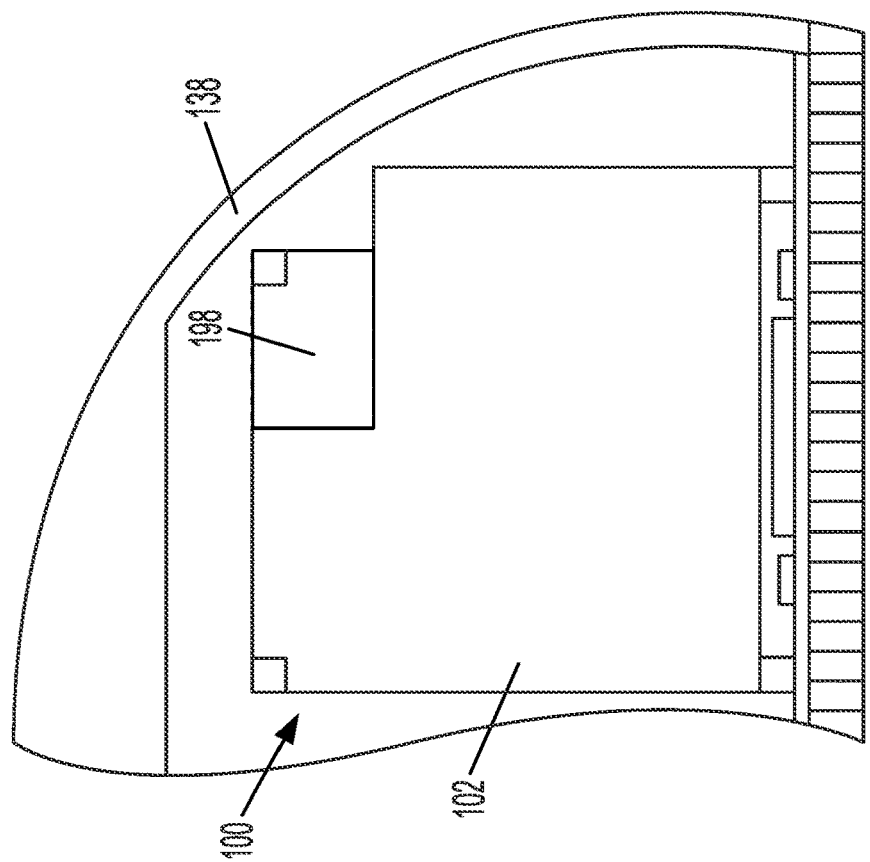
FIG. 28 depicts a transformable cargo container in an aircraft configuration and stored in a fuselage of an aircraft, according to an example implementation.

In refrigerated embodiments such as those shown in FIGS. 22-27, the one or more supply ducts 110 take the form of a supply duct 200 (i.e., a single supply duct) that facilitates the constant supply of coolant into the main container body 102 in both the aircraft and ground configurations, as well as during the entire transition between the aircraft and ground configurations. This can be accomplished using a sliding plenum and/or a flexible supply duct. FIGS. 22-25 relate to the former, and FIGS. 26-27 relate to the latter. FIGS. 28-29 then depict a non-refrigerated embodiment of the transformable cargo container 100 having the slide box 198.

Figure 22:
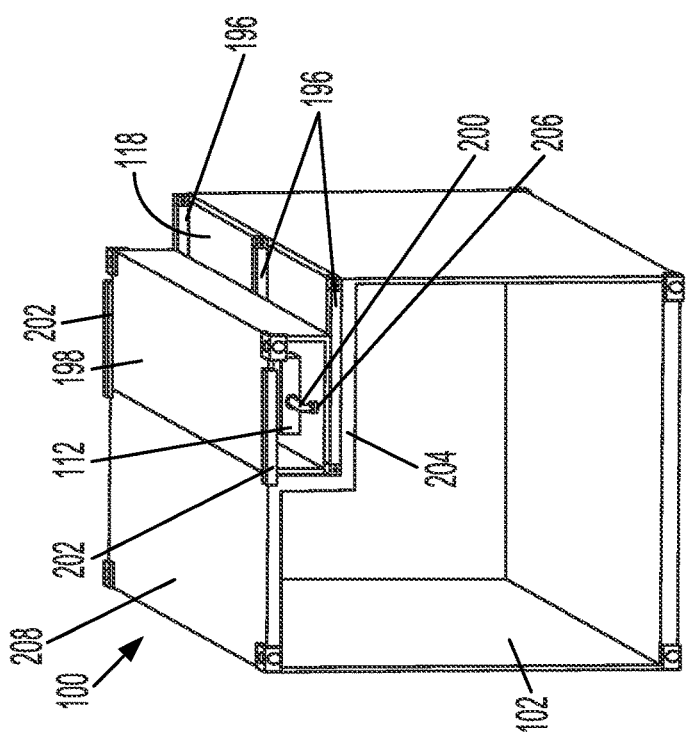
FIG. 22 depicts a perspective view of a transformable cargo container in an aircraft configuration, according to an example implementation.

FIG. 22 depicts a perspective view of the transformable cargo container 100 in the aircraft configuration in which the slide box 198 abuts a right sidewall of a top portion 208 of the main container body 102. As shown, in addition to the plurality of tracks 196, two supplemental tracks 202 are included as well to facilitate lateral movement of the slide box 198. In this embodiment, the main container body 102 includes a plenum 204 that is inside the main container body 102 and underneath the slide box 198. Further, the transformable assembly 104 also includes a sliding plenum lid 206 coupled between the plenum 204 and the supply duct 200. The sliding plenum lid 206 covers all openings between the main container body 102 and the plenum 204, thus helping to ensure a sealed system. Although not explicitly shown, the plenum 204 can include the at least one inlet 106 (i.e., a single inlet, in this case) through which coolant is supplied into the interior of the main container body 102.

Figure 23:
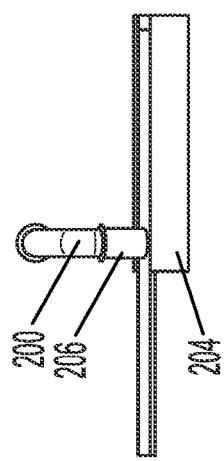
FIG. 23 depicts a front view of a supply duct, plenum, and plenum lid when a transformable cargo container is in an aircraft configuration, according to an example implementation.

FIG. 23 depicts a front view of the supply duct 200, the plenum 204, and the plenum lid 206 when the transformable cargo container 100 is in the aircraft configuration.

Figure 24:
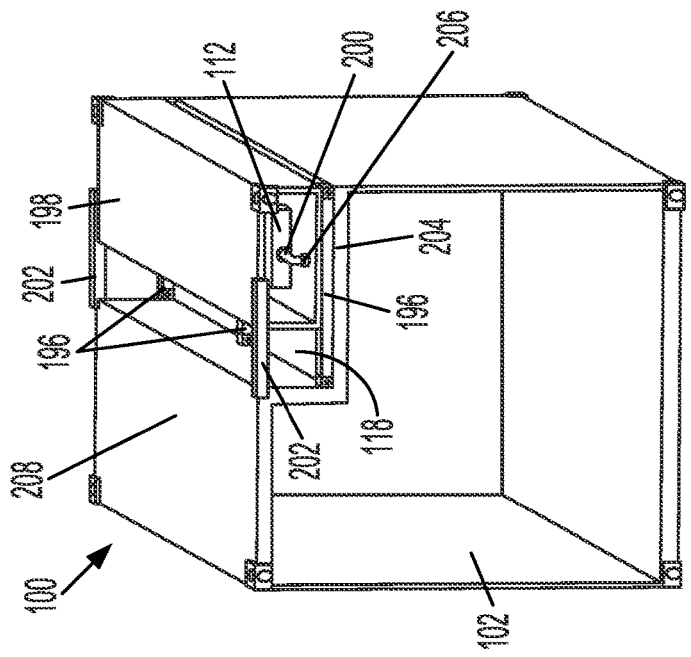
FIG. 24 depicts a perspective view of a transformable cargo container in a ground configuration, according to an example implementation.

FIG. 24 depicts a perspective view of the transformable cargo container 100 in the ground configuration.

Based on the transformable assembly 104 being in the ground configuration, another container (not shown in FIG. 24, but shown in FIG. 27) is storable on top of the main container body 102 and between the slide box 198 and the top portion 208 of the main container body 102. In particular, as shown, there is an empty space to the left of the slide box 198, which in some cases can be filled in with additional cargo containers selected based on the dimensions of the space and the dimensions of the slide box 198.

Figure 25:
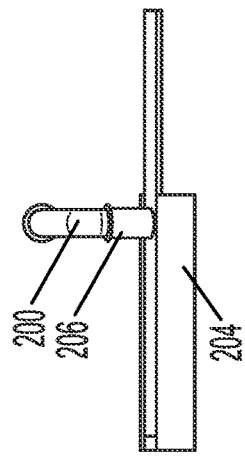
FIG. 25 depicts a front view of a supply duct, plenum, and plenum lid when a transformable cargo container is in a ground configuration, according to an example implementation.

FIG. 25 depicts a front view of the supply duct 200, the plenum 204, and the plenum lid 206 when the transformable cargo container 100 is in the ground configuration.

FIGS. 26-27 depicts an embodiment of the transformable cargo container 100 where the supply duct 200 is a flexible duct that connects the refrigeration equipment 112 to the at least one inlet 106 (i.e., a single inlet, in this case) in both the aircraft and ground configurations. To prevent coolant from escaping, the at least one inlet 106 and the supply duct 200 can be coupled by way of a rubber seal or other sealant between the slide box 198 and the main container body 102.

FIG. 26 first depicts the transformable cargo container 100 in the aircraft configuration and stored in the fuselage 138 of the aircraft 114.

FIG. 27 then depicts the transformable cargo container 100 in the ground configuration and with an additional container 210 stacked on the main container body 102 between the slide box 198 and the top portion 208 of the main container body 102.

FIG. 28 and FIG. 29 each depict a non-refrigerated embodiment of the transformable cargo container 100 that is in the aircraft configuration and stored in the fuselage 138 of the aircraft 114. The slide box 198 in FIG. 28 has a smaller dimension than the slide box 198 in FIG. 29.

Depending on the dimensions of the storage area of the fuselage 138 of the aircraft 114, the design of the transformable cargo container 100 and one or more components thereof (e.g., the slide box 198) can be adjusted so that the slide box 198 has adequate clearance between the slide box 198 and the interior wall of the storage area, while maximizing cargo volume. Depending on the make and model of the aircraft 114, this width dimension can vary.

Figure 30:
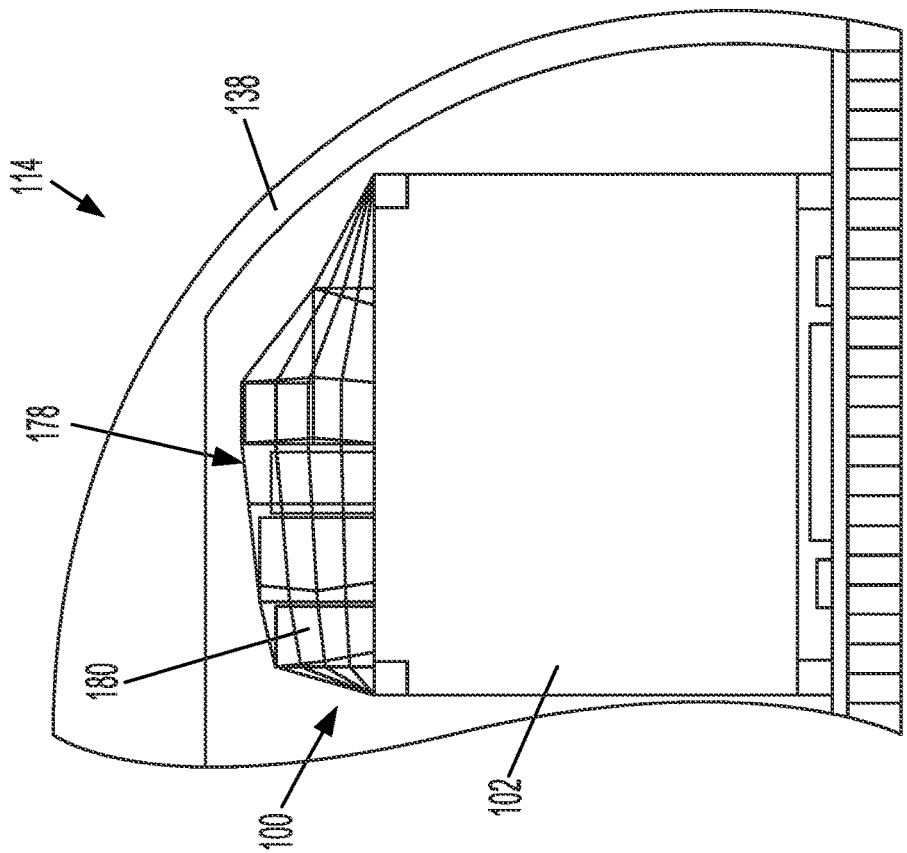
FIG. 30 depicts a cargo container stored in a fuselage of an aircraft with other cargo secured thereon under a cargo net, according to an example implementation.

FIG. 30 depicts an embodiment of the main container body 102 that is stored in the fuselage 138 of the aircraft 114. As shown, the main container body 102 has a substantially flat top surface and the plurality of other cargo 178 are stacked on the main container body 102 and secured with the cargo net 180. The cargo net 180 is attached to the top edges of the main container body 102 by way of clasps, D-rings, and/or other latching mechanisms.

Figure 31:
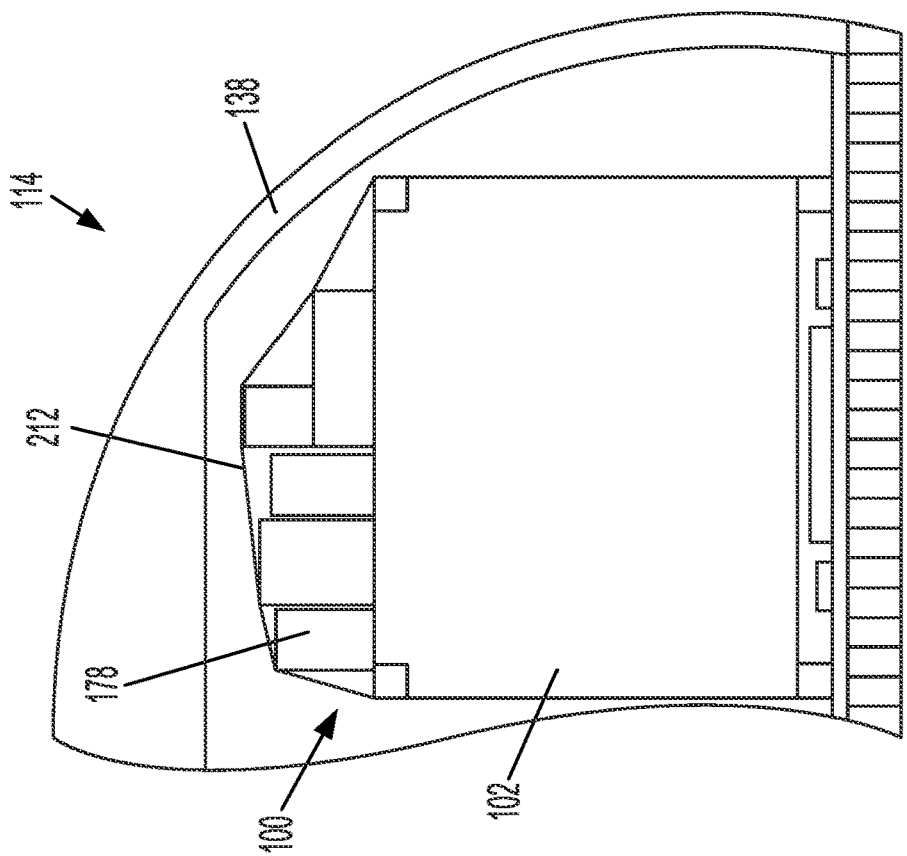
FIG. 31 depicts a cargo container stored in a fuselage of an aircraft with other cargo secured thereon under straps, according to an example implementation.

FIG. 31 depicts an embodiment of the main container body 102 that is stored in the fuselage 138 of the aircraft 114. As shown, the main container body 102 has a substantially flat top surface and the plurality of other cargo 178 are stacked on the main container body 102 and secured with a strap 212 by way of clasps, D-rings, and/or other latching mechanisms. Within examples, the strap 212 is one of a plurality of straps that are used to secure the plurality of other cargo 178. Shrink wrap can be used additionally or alternatively to straps.

The configurations of FIGS. 30-31 enable the convenient placement of loose cargo on the top of the main container body 102, which can be convenient for cargo operators in filling any remaining storage space between the main container body 102 and the fuselage 138. After the cargo container reaches a destination airport, the plurality of other cargo 178 can be unloaded.

Figure 32:
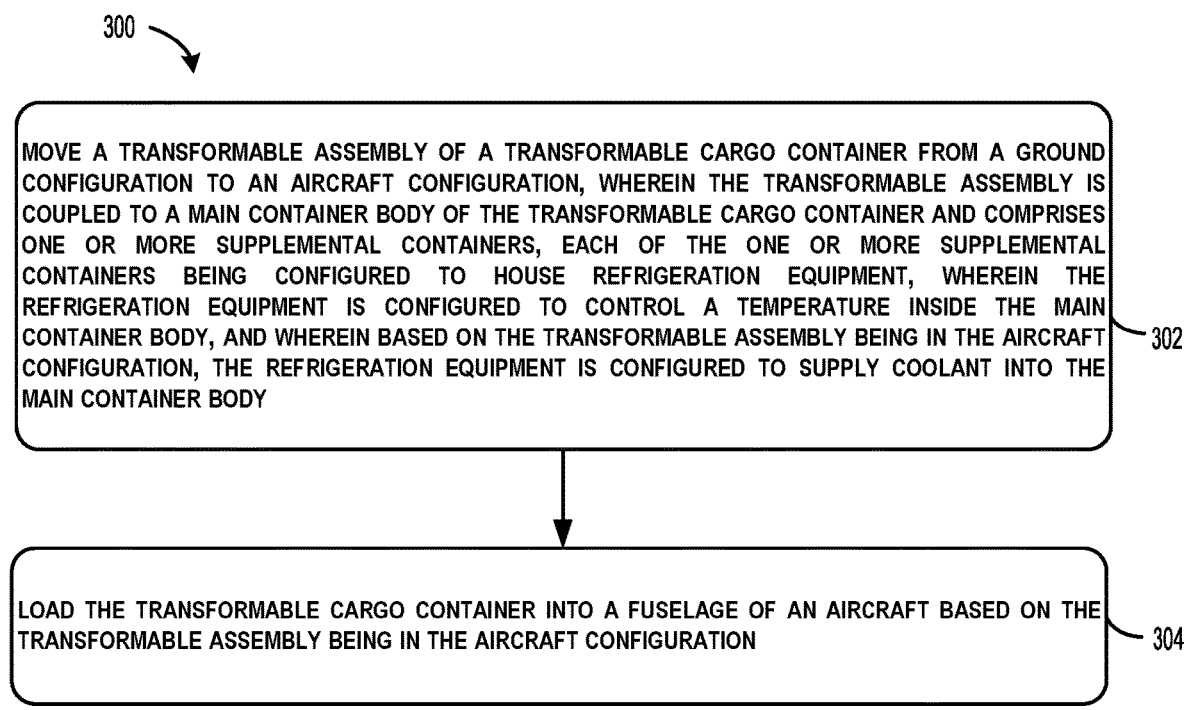
FIG. 32 shows a flowchart of a method, according to an example implementation.

FIG. 32 shows a flowchart of an example of a method 300. Method 300 could be used with the transformable cargo container 100 and components thereof shown in FIGS. 1-31. Method 300 may include one or more operations, functions, or actions as illustrated by one or more of blocks 302-304.

At block 302, the method 300 includes moving a transformable assembly of a transformable cargo container from a ground configuration to an aircraft configuration, wherein the transformable assembly is coupled to a main container body of the transformable cargo container and comprises one or more supplemental containers, at least one of the one or more supplemental containers being configured to house refrigeration equipment, wherein the refrigeration equipment is configured to control a temperature inside the main container body, and wherein based on the transformable assembly being in the aircraft configuration, the refrigeration equipment is configured to supply coolant into the main container body.

At block 304, the method 300 includes loading the transformable cargo container into a fuselage of an aircraft based on the transformable assembly being in the aircraft configuration.

In some embodiments, based on the transformable assembly being in the aircraft configuration, the transformable cargo container has a non-rectangular cross-sectional area, and the loading of block 304 involves loading the transformable cargo container into a partially-circular cross-sectional storage area of the fuselage of the aircraft based on the transformable assembly being in the aircraft configuration.

In some embodiments, the moving of block 302 involves moving the one or more supplemental containers from a first position at one or both lateral sidewalls of the main container body to a second position on top of the main container body.

In some embodiments, the moving of block 302 involves moving the one or more supplemental containers from a first position on top of the main container body to a second position on top of the main container body, different from the first position.

In some embodiments, the method 300 also includes unloading the transformable cargo container from the fuselage of the aircraft based on the transformable assembly being in the aircraft configuration, and moving the transformable assembly from the aircraft configuration to the ground configuration. Within examples of such embodiments, the transformable assembly includes one or more supply ducts that are movable between an extended position outside of the one or more supplemental containers and a retracted position inside the one or more supplemental containers, and the method 300 also includes, before moving the transformable assembly from the aircraft configuration to the ground configuration, moving the one or more supply ducts from the extended position to the retracted position. Within other examples of such embodiments, the method 300 also includes loading the transformable cargo container directly (e.g., without unloading any cargo, such as temperature-sensitive products, and while maintaining refrigeration of the cargo) from the aircraft and onto a ground transportation vehicle.

Figure 33:
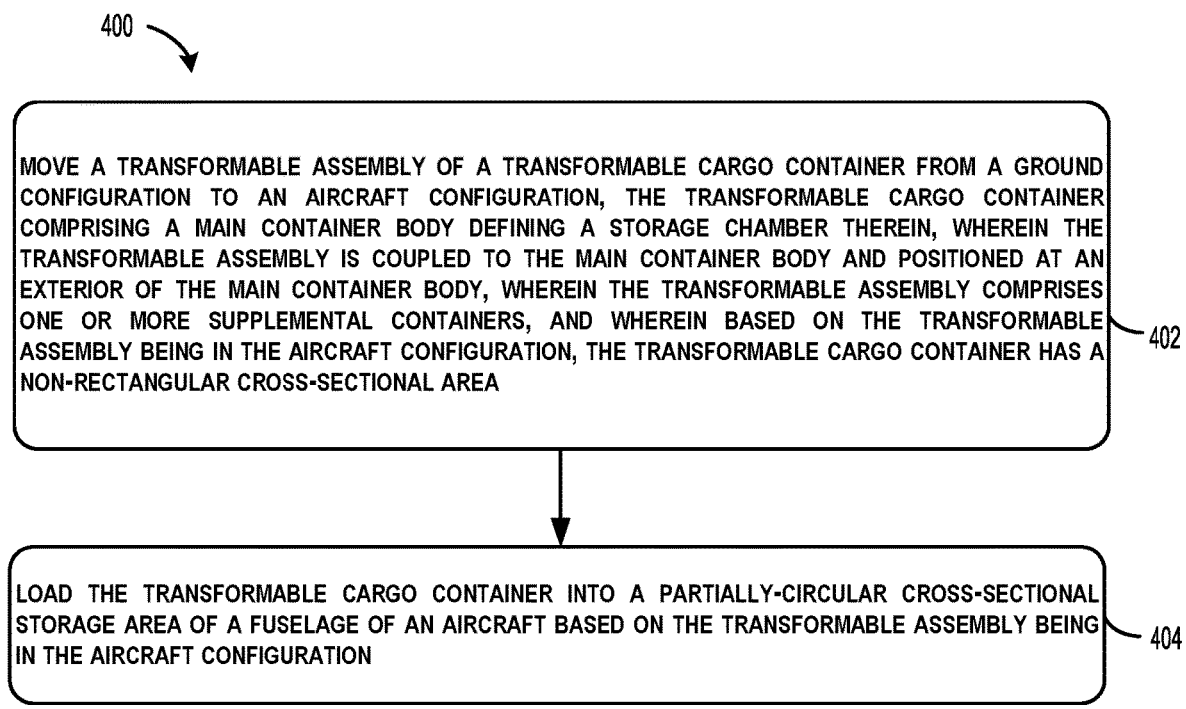
FIG. 33 shows a flowchart of another method, according to an example implementation.

FIG. 33 shows a flowchart of an example of a method 400. Method 400 could be used with the transformable cargo container 100 and components thereof shown in FIGS. 1-31. Method 400 may include one or more operations, functions, or actions as illustrated by one or more of blocks 402-404.

At block 402, the method 400 includes moving a transformable assembly of a transformable cargo container from a ground configuration to an aircraft configuration, the transformable cargo container comprising a main container body defining a storage chamber therein, wherein the transformable assembly is coupled to the main container body and positioned at an exterior of the main container body, wherein the transformable assembly comprises one or more supplemental containers, and wherein based on the transformable assembly being in the aircraft configuration, the transformable cargo container has a non-rectangular cross-sectional area.

At block 404, the method 400 includes loading the transformable cargo container into a partially-circular cross-sectional storage area of a fuselage of an aircraft based on the transformable assembly being in the aircraft configuration.

In some embodiments, the moving of block 402 involves moving the one or more supplemental containers from a first position at one or both lateral sidewalls of the main container body to a second position on top of the main container body.

In some embodiments, the moving of block 402 involves moving the one or more supplemental containers from a first position on top of the main container body to a second position on top of the main container body, different from the first position.

In some embodiments, the method 400 also includes unloading the transformable cargo container from the fuselage of the aircraft based on the transformable assembly being in the aircraft configuration, and moving the transformable assembly from the aircraft configuration to the ground configuration. Within examples of such embodiments, the method 400 also includes loading the transformable cargo container directly from the aircraft and onto a ground transportation vehicle, and stacking one or more other containers on the transformable cargo container based on the transformable assembly being in the ground configuration.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A transformable cargo container for use with ground and air transportation vehicles, the transformable cargo container comprising:
   a main container body defining a storage chamber therein and comprising at least one inlet; and
   a transformable assembly coupled to the main container body and positioned at an exterior of the main container body, wherein:
   the transformable assembly comprises one or more supplemental containers and one or more supply ducts, at least one of the one or more supplemental containers being configured to house refrigeration equipment,
   the one or more supplemental containers comprises a first container rotatably coupled to the main container body via a first hinge and a second container rotatably coupled to the first container via a second hinge and a bracket, the refrigeration equipment is configured to control a temperature inside the main container body, the transformable assembly is configured to be moved between an aircraft configuration and a ground configuration, the first hinge is configured to couple to a sprocket, the transformable assembly further comprises a drive gear coupled to the main container body and configured to couple to the sprocket and move the transformable assembly between the aircraft configuration and the ground configuration based on movement of the sprocket, based on the transformable assembly being in the aircraft configuration, the refrigeration equipment is configured to supply coolant into the main container body via the one or more supply ducts and the at least one inlet, and based on the transformable assembly being in the ground configuration, the refrigeration equipment is configured to supply coolant into the main container body via the one or more supply ducts and the at least one inlet.

2. The transformable cargo container of claim 1, further comprising:
at least one coolant diffuser coupled to the at least one inlet and positioned within the main container body.

3. The transformable cargo container of claim 1, wherein:
the one or more supply ducts are movable between an extended position outside of the one or more supplemental containers and a retracted position inside the one or more supplemental containers.

4. The transformable cargo container of claim 1, wherein:
the one or more supply ducts comprise a first supply duct and a second supply duct, each disposed at least partially within the one or more supplemental containers,
based on the transformable assembly being in the aircraft configuration, the refrigeration equipment is configured to supply coolant into the main container body via the first supply duct and the at least one inlet, and
based on the transformable assembly being in the ground configuration, the refrigeration equipment is configured to supply coolant into the main container body via the second supply duct and the at least one inlet.

5. The transformable cargo container of claim 1, wherein:
based on the transformable assembly being in the aircraft configuration, the one or more supplemental containers are positioned at one or both lateral sidewalls of the main container body, and
based on the transformable assembly being in the ground configuration, the one or more supplemental containers are positioned on top of the main container body.

6. The transformable cargo container of claim 1, wherein:
the main container body comprises a track disposed on a longitudinal sidewall of the main container body, and
the one or more supplemental containers comprises a fulcrum box positioned at a lateral sidewall of the main container body and slidably and pivotably coupled to the track.

7. The transformable cargo container of claim 6, wherein:
the fulcrum box comprises a plurality of hinged panels configured to move the fulcrum box between a retracted position in which the fulcrum box is retracted inward towards the main container body and an extended positon in which the fulcrum box is extended outward away from the main container body, and based on the fulcrum box being in the extended position, the fulcrum box is configured to move around a top corner of the main container body.

8. The transformable cargo container of claim 1, wherein:
based on the transformable assembly being in the aircraft configuration, the one or more supplemental containers are positioned on top of the main container body, and
based on the transformable assembly being in the ground configuration, the one or more supplemental containers are positioned on top of the main container body.

9. The transformable cargo container of claim 1, wherein:
the main container body comprises a plurality of tracks,
the one or more supplemental containers comprises a swing box,
the transformable assembly further comprises a support structure coupled to the swing box, and
the support structure is configured to move along the plurality of tracks.

10. The transformable cargo container of claim 1, wherein:
the one or more supplemental containers comprises a hinge box rotatably coupled to a top of the main container body via a hinge.

11. The transformable cargo container of claim 1, wherein:
the main container body comprises a plurality of tracks disposed on a top of the main container body, and
the one or more supplemental containers comprises a slide box configured to move laterally along the plurality of tracks.

12. The transformable cargo container of claim 11, wherein a width of the slide box is selected based on a width of a partially-circular cross-sectional storage area of a fuselage of an aircraft.

13. The transformable cargo container of claim 1, wherein:
based on the transformable assembly being in the aircraft configuration, the transformable cargo container has a non-rectangular cross-sectional area and is configured to occupy a partially-circular cross-sectional storage area of a fuselage of an aircraft, and
based on the transformable assembly being in the ground configuration, the transformable cargo container is configured to occupy a rectangular cross-sectional storage area on a ground transportation vehicle.

14. A method comprising:
moving a transformable assembly of a transformable cargo container from a ground configuration to an aircraft configuration, wherein the transformable assembly is coupled to a main container body of the transformable cargo container and comprises one or more supplemental containers, at least one of the one or more supplemental containers being configured to house refrigeration equipment, wherein the one or more supplemental containers comprises a first container rotatably coupled to the main container body via a first hinge and a second container rotatably coupled to the first container via a second hinge and a bracket, wherein the refrigeration equipment is configured to control a temperature inside the main container body, wherein the first hinge is configured to couple to a sprocket, wherein the transformable assembly further comprises a drive gear coupled to the main container body and configured to couple to the sprocket and move the transformable assembly between the aircraft configuration and the ground configuration based on movement of the sprocket, and wherein based on the transformable assembly being in the aircraft configuration, the refrigeration equipment is configured to supply coolant into the main container body; and
loading the transformable cargo container into a fuselage of an aircraft based on the transformable assembly being in the aircraft configuration.

15. The method of claim 14, wherein:
based on the transformable assembly being in the aircraft configuration, the transformable cargo container has a non-rectangular cross-sectional area, and
loading the transformable cargo container into the fuselage of the aircraft based on the transformable assembly being in the aircraft configuration comprises loading the transformable cargo container into a partially-circular cross-sectional storage area of the fuselage of the aircraft based on the transformable assembly being in the aircraft configuration.

16. The method of claim 14, wherein:
moving the transformable assembly from the ground configuration to the aircraft configuration comprises moving the one or more supplemental containers from a first position at one or both lateral sidewalls of the main container body to a second position on top of the main container body.

17. The method of claim 14, wherein:
moving the transformable assembly from the ground configuration to the aircraft configuration comprises moving the one or more supplemental containers from a first position on top of the main container body to a second position on top of the main container body, different from the first position.

18. The method of claim 14, further comprising:
unloading the transformable cargo container from the fuselage of the aircraft based on the transformable assembly being in the aircraft configuration; and
moving the transformable assembly from the aircraft configuration to the ground configuration.

19. The method of claim 18, wherein:
the transformable assembly further comprises one or more supply ducts that are movable between an extended position outside of the one or more supplemental containers and a retracted position inside the one or more supplemental containers, and
the method further comprises:
before moving the transformable assembly from the aircraft configuration to the ground configuration, moving the one or more supply ducts from the extended position to the retracted position.

20. The method of claim 18, further comprising:
loading the transformable cargo container directly from the aircraft and onto a ground transportation vehicle.

21. A transformable cargo container for use with ground and air transportation vehicles, the transformable cargo container comprising:
a main container body defining a storage chamber therein and comprising at least one inlet; and
a transformable assembly coupled to the main container body and positioned at an exterior of the main container body, wherein:
the transformable assembly comprises one or more supplemental containers and one or more supply ducts, at least one of the one or more supplemental containers being configured to house refrigeration equipment,
the one or more supplemental containers comprises a first container rotatably coupled to the main container body via a first hinge and a second container rotatably coupled to the first container via a second hinge and a bracket,
the refrigeration equipment is configured to control a temperature inside the main container body,
the transformable assembly is configured to be moved between an aircraft configuration and a ground configuration,
the first hinge is configured to couple to a sprocket,
the transformable assembly further comprises a drive gear coupled to the main container body and configured to couple to the sprocket and move the transformable assembly between the aircraft configuration and the ground configuration based on movement of the sprocket,
based on the transformable assembly being in the aircraft configuration, (i) the one or more supplemental containers are positioned on top of the main container body in a first position and (ii) the refrigeration equipment is configured to supply coolant into the main container body via the one or more supply ducts and the at least one inlet, and
based on the transformable assembly being in the ground configuration, (i) the one or more supplemental containers are positioned on top of the main container body in a second position on top of the main container body, different from the first position, and (ii) the refrigeration equipment is configured to supply coolant into the main container body via the one or more supply ducts and the at least one inlet.

* * * * *